(12) United States Patent
Nakazato

(10) Patent No.: US 12,281,717 B2
(45) Date of Patent: *Apr. 22, 2025

(54) METHOD OF OPENING FLUID CONTROL VALVE AND FLUID CONTROL VALVE USED FOR THE SAME

(71) Applicant: COSMO KOKI CO., LTD., Tokyo (JP)

(72) Inventor: Kensuke Nakazato, Tokyo (JP)

(73) Assignee: COSMO KOKI CO., LTD. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/627,370

(22) Filed: Apr. 4, 2024

(65) Prior Publication Data

US 2024/0288077 A1 Aug. 29, 2024

Related U.S. Application Data

(63) Continuation of application No. 17/791,188, filed as application No. PCT/JP2021/042190 on Nov. 17, 2021, now Pat. No. 11,994,226.

(30) Foreign Application Priority Data

Dec. 10, 2020 (JP) .................................. 2020-205370

(51) Int. Cl.
*F16L 55/105* (2006.01)
*F16K 3/02* (2006.01)
*F16L 55/16* (2006.01)

(52) U.S. Cl.
CPC ............. *F16K 3/0281* (2013.01); *F16K 3/02* (2013.01); *F16L 55/105* (2013.01);
(Continued)

(58) Field of Classification Search
CPC ........ F16K 3/0281; F16K 3/02; F16L 55/105; F16L 55/1608; Y10T 137/6113; Y10T 137/612
(Continued)

(56) References Cited

U.S. PATENT DOCUMENTS

| 5,074,526 A | 12/1991 | Ragsdale et al. |
| 8,047,219 B2 | 11/2011 | Puckett et al. .......... F16L 55/18 |

(Continued)

FOREIGN PATENT DOCUMENTS

| JP | H7190277 | 7/1995 | ............. F16L 55/00 |
| JP | H11182771 | 7/1999 | ............. F16L 41/04 |

(Continued)

OTHER PUBLICATIONS

International Search Report and Written Opinion issued in PCT/JP2021/042190, dated Feb. 1, 2022, with English translation, 13 pages.

(Continued)

*Primary Examiner* — John Bastianelli
(74) *Attorney, Agent, or Firm* — HAYES SOLOWAY P.C.

(57) ABSTRACT

A method of opening a fluid control valve having a housing externally fitted onto a fluid pipe in a hermetic state and a valve body configured for contacting an inner peripheral surface of a hole of the fluid pipe provided in the housing and an inner peripheral surface of the fluid pipe to hermetically block or open a flow of fluid in the fluid pipe. The method includes a pressure adjustment step of decreasing a pressure difference between the fluid in the fluid pipe on a first side of the valve body and the fluid in the fluid pipe on a second side of the valve body in a blocking state of the valve body. The first side and the second side of the valve body are arranged so as to sandwich the valve body in an axial direction of the fluid pipe, and a valve opening step of opening the valve body.

5 Claims, 23 Drawing Sheets

(52) U.S. Cl.
CPC ..... *F16L 55/1608* (2013.01); *Y10T 137/6113* (2015.04); *Y10T 137/612* (2015.04)

(58) Field of Classification Search
USPC ................. 251/326–329; 137/315.42, 317
See application file for complete search history.

(56) References Cited

U.S. PATENT DOCUMENTS

| | | | |
|---|---|---|---|
| 8,695,626 B2 | 4/2014 | Murphy et al. ......... | F16L 43/00 |
| 8,720,465 B2 | 5/2014 | Sato et al. .............. | B23B 41/08 |
| 9,644,778 B2 | 5/2017 | Sato et al. .............. | F16L 55/18 |
| 10,473,560 B2 | 11/2019 | Nelson et al. ........... | G01N 1/08 |
| 2021/0254772 A1 | 8/2021 | Kaneta et al. .......... | F16L 41/06 |

FOREIGN PATENT DOCUMENTS

| | | | | |
|---|---|---|---|---|
| JP | 2000266273 | 9/2000 | .............. | F16L 55/00 |
| JP | 2003139252 | 5/2003 | .............. | F16K 3/02 |
| WO | WO 2020049879 | 3/2020 | .............. | F16L 55/00 |

OTHER PUBLICATIONS

International Preliminary Report on Patentability issued in PCT/JP2021/042190, dated Jun. 13, 2023, 6 pages.
Canadian Office Action dated Oct. 3, 2023 issued in related Canadian Patent Appln. No. 3,167,906, 3 pages.
U.S. Appl. No. 17/791,188, filed Jul. 6, 2022, Nakazato.
Extended European Search Report issued in EP Patent Appln. Serial No. 21903129.1-1015, dated Aug. 2, 2024, 7 pages.

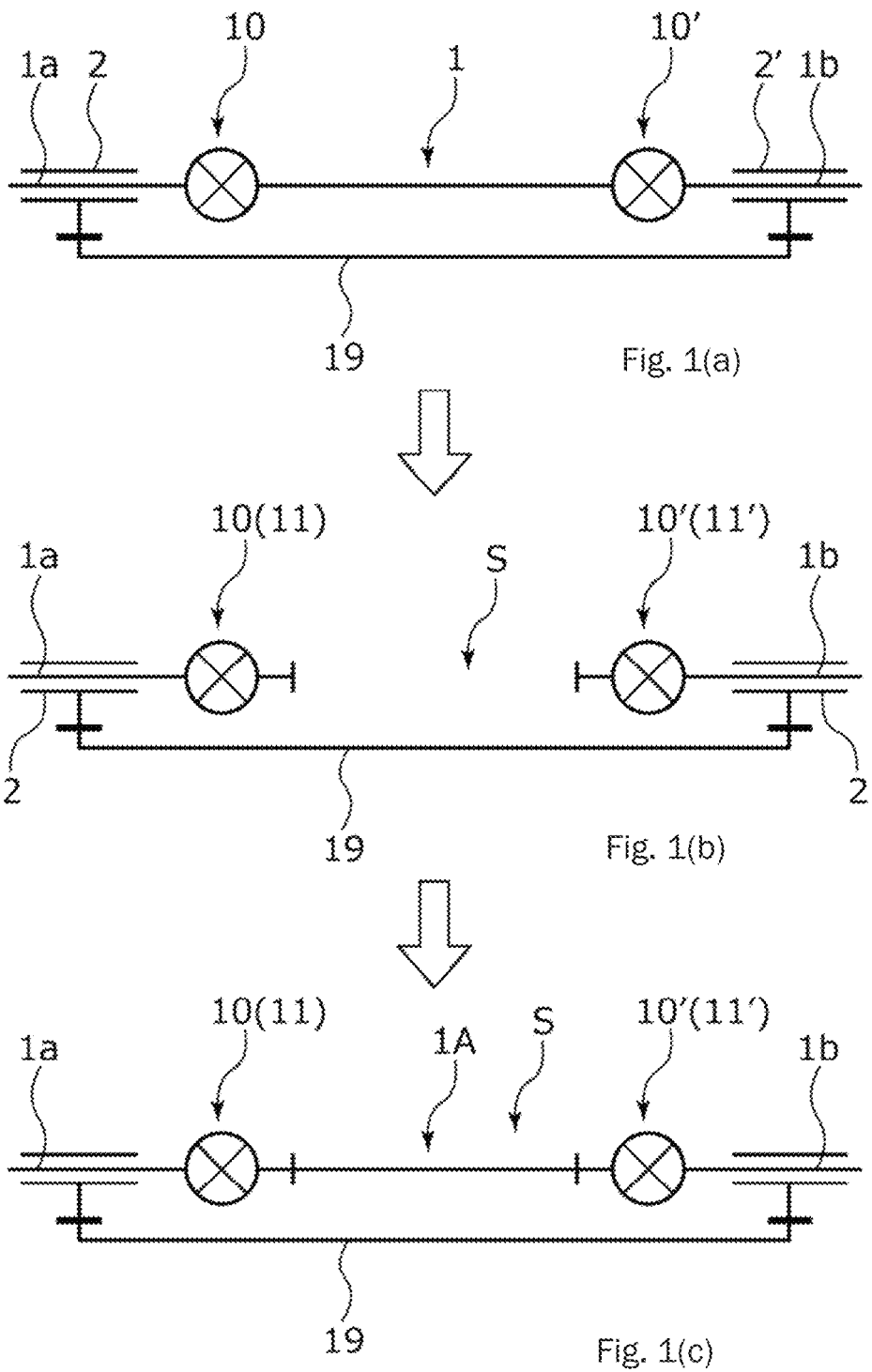

METHOD OF OPENING FLUID CONTROL VALVE AND FLUID CONTROL VALVE USED FOR THE SAME

CROSS REFERENCE TO RELATED APPLICATION

This application is a continuation application of U.S. patent application Ser. No. 17/791,188, filed Jul. 6, 2022, which is a 371 filing of PCT International Patent Application Serial No. PCT/JP2021/042190, filed Nov. 17, 2021, the contents of which are incorporated herein by reference.

TECHNICAL FIELD

The present invention relates to the method of opening a fluid control valve for controlling pipe fluid and a fluid control valve used for such a method.

BACKGROUND ART

In some cases, for a fluid pipe forming an existing pipe line in which, e.g., water or gas flows, part of the existing fluid pipe is changed to a new fluid pipe or the pipe line degraded due to aging is blocked for coping with degradation due to aging or forming a new branched passage. As one example of these cases, an uninterrupted flow technique has been generally performed. In such a technique, two fluid control valves are attached apart from each other in a pipe axis direction of the existing fluid pipe to block the flow of fluid in a predetermined section of the fluid pipe by a valve body of each fluid control valve. In addition, both sides (an upstream side and a downstream side) of the predetermined section are bypassed and communicate with each other through a bypass pipe, and with the bypass pipe, part of the predetermined section is replaced with the new fluid pipe without the need for stopping the flow of fluid in the fluid pipe.

For example, a fluid control valve of Patent Citation 1 includes a housing hermetically attached to an outer peripheral surface of a fluid pipe, a case hermetically connected to a branch portion of the housing, and a valve body accommodated in the case in advance and capable of moving back and forth toward the fluid pipe. A process hole into which a cutting tool can be inserted is formed at the case, and the cutting tool inserted into the case through the process hole is operated from the outside so that a hole can be formed at the fluid pipe. The valve body includes a valve body portion moving back and forth relative to the fluid pipe by screw operation and a seal portion provided at an outer surface of the valve body. In the fluid control valve, after the hole has been formed at the fluid pipe, the valve body is moved toward the fluid pipe by screw operation and is inserted into the hole accordingly. The seal portion is pressed against an inner peripheral surface of the hole and an inner peripheral surface of the fluid pipe so that the flow of fluid in the fluid pipe can be blocked.

CITATION LIST

Patent Literature

Patent Citation 1: JP 2000-266273 A (Page 3, FIG. 4)

SUMMARY OF INVENTION

Technical Problem

Regarding the fluid control valve of Patent Citation 1, in a state in which pipe fluid in a predetermined section between two fluid control valves attached apart from each other in a pipe axis direction of an existing fluid pipe has been discharged, the process of replacement with a new fluid pipe can be easily performed. However, pipe fluid is present outside the predetermined section at a valve body of each fluid control valve sandwiching the predetermined section in the pipe axis direction, and on the other hand, atmospheric air with a lower pressure than that of the pipe fluid is present inside the predetermined section. Thus, the valve body of the fluid control valve is pressed to one side (the inside of the predetermined section) in the pipe axis direction by the pressure of fluid in the fluid pipe. Thus, tendency shows that upon opening of the valve body, the valve body is inclined due to, e.g., the fluid pressure. There is a probability that the inner peripheral surface of the hole and the seal portion contacting the inner peripheral surface of the hole excessively pressure-contact each other and the operation of opening the valve body is difficult due to friction force therebetween. Specifically, in the case of a high pressure of equal to or higher than 0.75 MPa and the case of a high flow velocity, there is a probability that the operation of opening the valve body is prominently difficult. Moreover, there is a probability that when the hole is formed by the cutting tool such as an endmill or a hole saw, the seal portion of the valve body is pressed against cutting burrs formed at the hole and the seal portion is damaged due to the forcible valve opening operation.

The present invention has been made in view of the above-described problems, and is intended to provide the method of opening a fluid control valve whose valve body opening operation is easy and a fluid control valve used for such a method.

Solution to Problem

For solving the above-described problems, the method according to the present invention is a method of opening a fluid control valve for controlling fluid, the fluid control valve including a housing externally fitted onto a fluid pipe in a hermetic state and a valve body configured for contacting an inner peripheral surface of a hole of the fluid pipe provided in the housing and an inner peripheral surface of the fluid pipe to hermetically block or open a flow of fluid in the fluid pipe. The method includes: a pressure adjustment step of decreasing a pressure difference between the fluid in the fluid pipe on a first side of the valve body and the fluid in the fluid pipe on a second side of the valve body in a blocking state of the valve body, the first side and the second side of the valve body being arranged so as to sandwich the valve body in an axial direction of the fluid pipe; and a valve opening step of opening the valve body. According to this feature of the present invention, the valve body is opened in a state in which the pressure difference between the first side and the second side of the valve body in the pipe axis direction is decreased. This can avoid the valve body from excessively pressure-contacting the inner peripheral surface of the hole by the pressure of fluid flowing in the fluid pipe, and can easily perform the operation of opening the valve body.

It may be preferable that in the pressure adjustment step, the fluid in the fluid pipe on the first side of the valve body is charged to the fluid pipe on the second side of the valve body. According to this feature, the same fluid in the fluid pipe is charged to the first side and the second side of the valve body in the pipe axis direction in the fluid pipe, and therefore, the first side and the second side of the valve body in the pipe axis direction can be easily adjusted to the same pressure.

It may be preferable that the valve body includes a valve body portion configured for moving back and forth relative to the fluid pipe, a seal portion provided at an outer surface of the valve body portion, and a movement portion configured for moving relative to the valve body portion, the seal portion being expanded when the movement portion moves relative to the valve body portion taking a valve close position, the valve opening step includes a first step of moving the movement portion in a valve opening direction and a second step of moving the valve body portion in the valve opening direction together with the movement portion, and the pressure adjustment step is started taking the first step as a trigger. According to this feature, the pressure adjustment step is started before the second step of moving the valve body portion in the valve opening direction together with the movement portion. Thus, when the second step is performed, the pressure difference between the first side and the second side of the valve body in the pipe axis direction can be reliably decreased. (Moreover, the pressure difference between one side and the other side of the valve body in the pipe axis direction can be decreased within a short period of time.)

The fluid control valve according to the present invention is a fluid control valve for controlling fluid, including: a housing externally fitted onto a fluid pipe in a hermetic state; and a valve body having a valve body portion configured for moving back and forth relative to the fluid pipe and a seal portion provided at an outer surface of the valve body portion, wherein the seal portion is configured for hermetically contacting an inner peripheral surface of a hole of the fluid pipe formed in the housing and an inner peripheral surface of the fluid pipe to block or open a flow of fluid in the fluid pipe, the valve body portion is in a hollow shape, and is provided with a first communication hole communicating with the fluid pipe on a first side of the valve body and a second communication hole communicating with the fluid pipe on a second side of the valve body, the first side and the second side of the valve body being arranged so as to sandwich the valve body in an axial direction of the fluid pipe, and the valve body has a switching mechanism configured for switching a communication state and a non-communication state between the first communication hole and the second communication hole. According to this feature, upon closing of the valve body, the switching unit switches the first communication hole and the second communication hole to the non-communication state so that the flow of fluid in the fluid pipe can be blocked. Upon opening of the valve body, the switching unit switches the first communication hole and the second communication hole to the communication state so that the pressure difference between both sides of the valve body in the pipe axis direction can be decreased and valve opening operation can be easily performed for the valve body.

It may be preferable that the valve body further includes a movement portion configured for moving relative to the valve body portion, the seal portion being expanded when the movement portion moves relative to the valve body portion taking a valve close position, and the switching mechanism includes a plug portion provided at the movement portion and configured for opening and closing at least one of the first communication hole or the second communication hole. According to this feature, upon closing of the valve body, after the movement portion and the valve body portion have moved to the fluid pipe and the seal portion has contacted the inner peripheral surface of the fluid pipe, when the movement portion is further moved to expand the seal portion to block the flow of fluid in the fluid pipe, at least one of the first communication hole or the second communication hole can be closed by the plug portion. Upon opening of the valve body, only the movement portion is retreated while the valve body portion and the seal portion are holding a valve close state, and therefore, the first communication hole and the second communication hole can be opened by the plug portion. Thus, the pressure difference between both sides of the valve body in the pipe axis direction can be decreased.

It may be preferable that the plug portion is provided on a forward side of the movement portion in a movement direction. According to this feature, the plug portion is provided on the forward side of the movement portion in the movement direction. Thus, movement force of the movement portion is easily transmitted in a closing direction of the plug portion, and at least one of the first communication hole or the second communication hole can be reliably closed.

It may be preferable that the valve body further includes a movement portion configured for moving relative to the valve body portion, the seal portion being expanded when the movement portion moves relative to the valve body portion taking a valve close position, and the movement portion is provided with a first plug portion and a second plug portion as the switching mechanism, the first plug portion being configured for opening and closing the first communication hole, the second plug portion being configured for opening and closing the second communication hole. According to this feature, both of the first communication hole and the second communication hole can be closed by the first plug portion and the second plug portion, and therefore, the first communication hole and the second communication hole can be reliably brought into the non-communication state.

BRIEF DESCRIPTION OF DRAWINGS

FIGS. 1A to 1C is a schematic view showing one example of the step of replacing an optional portion of a fluid pipe forming an existing pipe line with a new fluid pipe in an uninterrupted flow state in a first embodiment of the present invention.

DESCRIPTION OF EMBODIMENTS

Figure 2A:
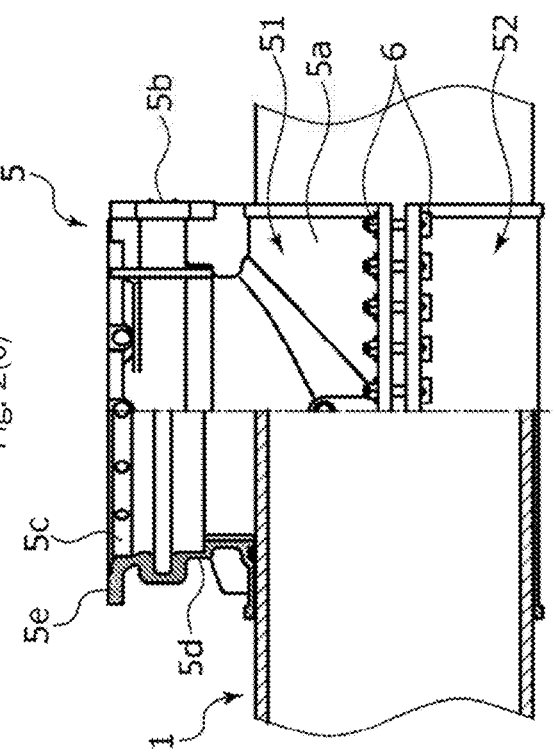
FIG. 2A is a partial sectional front view showing a housing fitted onto the fluid pipe in the first embodiment.

Hereinafter, the modes for carrying out the method of opening a valve body of a fluid control valve and a fluid control valve used for such a method according to the present invention will be described based on embodiments.

First Embodiment

A fluid control valve opening method and a fluid control valve used therefor according to a first embodiment of the present invention will be described with reference to FIGS. 1 to 12.

A fluid control valve 10 of the present embodiment is, for example, used for a construction for replacing an optional portion of a fluid pipe 1 forming an existing pipe line with a new fluid pipe 1A in an uninterrupted flow state. First, one example of the construction for replacing the optional portion of the fluid pipe 1 with the new fluid pipe 1A in the uninterrupted flow state will be schematically described. Note that for the sake of simplicity in description, the left side as viewed in the plane of paper of FIG. 1 will be described as an upstream side of the pipe line before the construction and the right side as viewed in the plane of paper will be described as a downstream side. However, the present invention is not limited to above, and the fluid control valve of the present invention is also applicable to a net-shaped pipe line whose upstream and downstream sides cannot be clearly distinguished from each other, for example.

As shown in FIG. 1A, the fluid control valves 10, 10' are first fitted onto and placed on the upstream and downstream sides with respect to a portion of the fluid pipe 1 to be replaced with the new fluid pipe 1A. Subsequently, branching housings 2, 2' are each fitted onto an upstream portion 1a of the fluid pipe 1 with respect to the upstream fluid control valve 10 and a downstream portion 1b of the fluid pipe 1 with respect to the downstream fluid control valve 10', and communicate with each other through a bypass pipe 19.

The branching housings 2, 2' each hermetically surround the portions 1a, 1b of the fluid pipe 1. Moreover, not-shown opening portions each communicating with the branching housings 2, 2' are formed at the portions 1a, 1b of the fluid pipe 1 by a well-known uninterrupted flow branching technique, and part of fluid flowing in the fluid pipe 1 flows in the branching housing 2, the bypass pipe 19, the branching housing 2', and the portion 1b from the opening portion of the portion 1a.

Subsequently, as shown in FIG. 1B, later-described valve bodies 11, 11' of the fluid control valves 10, 10' are closed to block the flow of fluid in a predetermined section S between the fluid control valves 10, 10', and part of the predetermined section S in the fluid pipe 1 is cut by a not-shown cutting unit. The term "block" described herein includes a blocking state at such a degree that the construction can be performed for the predetermined section S.

Subsequently, as shown in FIG. 1C, the new fluid pipe 1A is hermetically arranged in connection with the cut portion of the predetermined section S. Thereafter, the valve bodies 11, 11' of the fluid control valves 10, 10' are opened such that fluid flows in the predetermined section S. In addition, a not-shown valve arranged between the branching housing 2, 2' and the bypass pipe 19 is closed, and the bypass pipe 19 is detached. In this manner, the process of replacement with the new fluid pipe 1A is completed.

Note that fluid in the fluid pipe 1 is clean water in the present embodiment, but may be not only industrial water, agricultural water, and sewage water but also liquid other than water, gas, and a gas-liquid mixture of gas and liquid, for example. The fluid control valve 10 of the present embodiment is not limited to use upon replacement with the new fluid pipe 1A, and may be used in the case of arranging a valve device configured to control the flow of fluid in the fluid pipe 1 or a branching pipe configured to branch a fluid flow in a direction different from that of the fluid pipe 1.

Figure 2B:
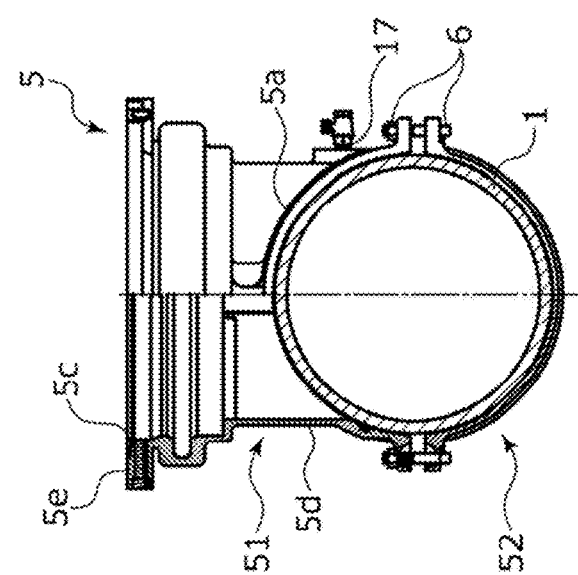
FIG. 2B is a partial sectional side view.
Figure 2C:
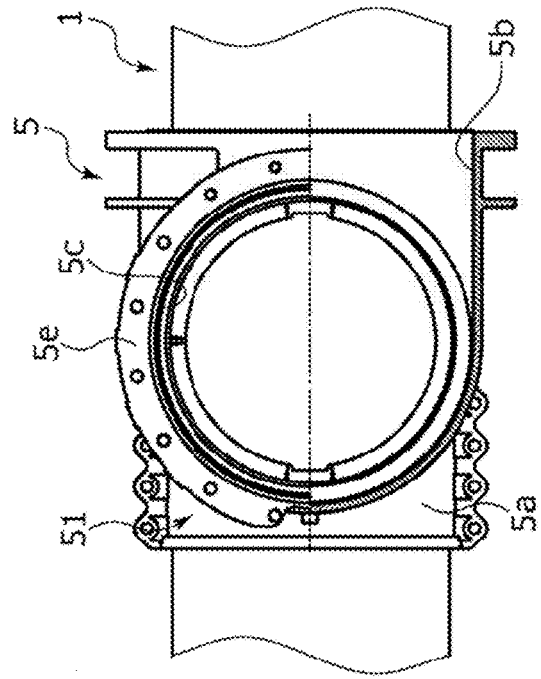
FIG. 2C is a partial sectional plan view.

The fluid pipe 1 of the present embodiment is a ductile cast iron pipe with a relatively-great diameter (e.g., a diameter of equal to or greater than 200 mm), and as shown in FIGS. 2A to 2C, is formed as a straight pipe in a substantially circular shape as viewed in the section. In the present embodiment, a pipe line direction of the fluid pipe 1 is arranged substantially in the horizontal direction. Note that the fluid pipe according to the present invention may be made of metal such as other cast irons or copper, cement, vinyl chloride, polyethylene, or polyolefin. Further, note that an inner peripheral surface of the fluid pipe may be coated with, e.g., an epoxy resin layer, mortar, or plating, or may be coated with an optional material by powder coating. The pipe line direction may be arranged substantially vertically or diagonally.

The fluid pipe of the present invention as described herein is not limited to the straight pipe as in the embodiment, and may be a deformed pipe, for example. The deformed pipe described herein is a collective term of various pipes at least partially having deformed portions such as a curved pipe portion, a branch portion, a cross portion, a different-diameter portion, a collar portion, a short pipe portion, and a draining portion.

Next, the structure of the fluid control valve 10 and installation thereof will be described. Note that the fluid control valves 10, 10' have the same structure, and therefore, description of the fluid control valve 10' will be omitted.

First, as shown in FIGS. 2A to 2C, after an outer surface of the fluid pipe 1 as a portion for attaching the fluid control valve 10 according to the present invention has been cleaned, a housing 5 forming the fluid control valve 10 is hermetically fitted on through a seal member for sealing a later-described drilled portion of the fluid pipe 1. The housing 5 has a divided structure including multiple divided bodies, and in the present embodiment, mainly includes a first divided body 51 forming an upper side and a second divided body 52 forming a lower side. Note that the divided structure of the housing 5 is not limited to one described in the present embodiment, and for example, the housing 5 may be divided in the horizontal direction or the number of divisions may be a predetermined number of equal to or greater than three. In the present embodiment, the divided housings are joined to each other in a hermetic state by fastening members 6 including bolts/nuts, but the present invention is not limited to above. For example, the divided housings may be joined by welding. Regarding the term "fit onto," a form in which the valve body 11 of the fluid control valve 10 is applied in an upper-lower direction will be described, but the present invention is not limited to such a form. The valve body may be applied in a right-left direction or a diagonal direction.

The first divided body 51 of the housing 5 includes a pipe line housing portion 5a extending in the pipe line direction along the fluid pipe 1, an open end portion 5c c extending to branch in the upper-lower direction at the substantially center of the pipe line housing portion 5a and opening upwardly, and a cylindrical neck portion 5d having an opening portion 5b opening laterally. The first divided body 51 is formed in an inverted T-shape as viewed from the front.

Further, an annular flange portion 5e protruding in an outer diameter direction of the neck portion 5d is provided at an end portion of the neck portion 5d on an open end portion 5c side.

The opening portion 5b opening laterally at the neck portion 5d opens in a substantially horizontally-elongated rectangular shape as viewed laterally, and as described later, is formed so that a process valve body 31 of a process valve device 3 can be inserted into the opening portion 5b.

A communication opening portion 17 penetrating the neck portion 5d from the inside to the outside thereof is formed at a lower portion of the neck portion 5d, and an opening/closing plug 18 is normally screwed into the communication opening portion 17.

Figure 3:
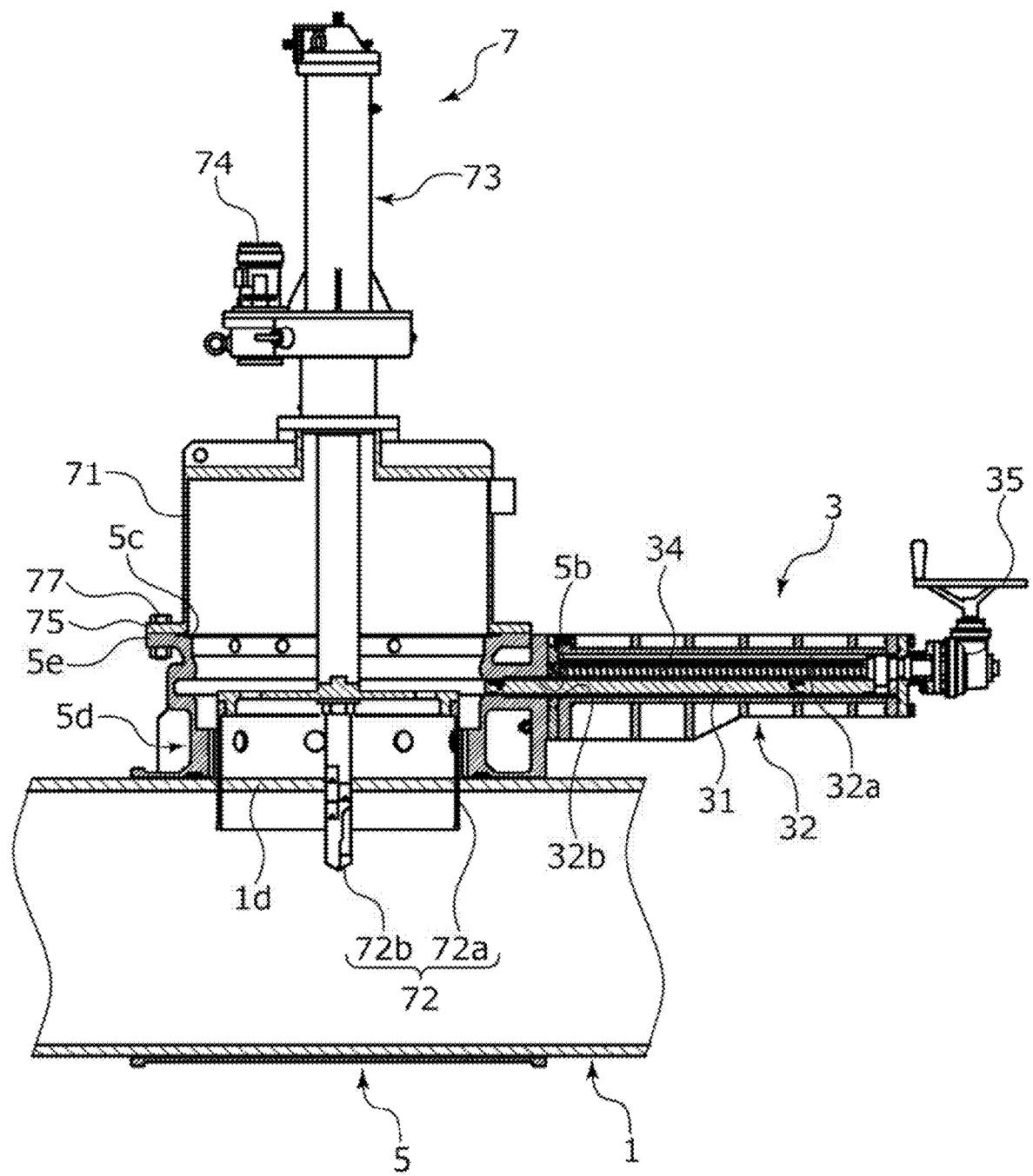
FIG. 3 is a front sectional view showing a situation where the fluid pipe is drilled by a boring machine in the first embodiment.

Next, as shown in FIG. 3, the process valve device 3 is hermetically connected to the opening portion 5b of the neck portion 5d. The process valve device 3 mainly includes the process valve body 31 openably sliding in the housing 5 and an accommodation member 32 as a process valve housing having an accommodation inner portion 32a accommodating the process valve body 31 such that the process valve body 31 is slidable in the horizontal direction and an opening portion 32b opening at one side end of the accommodation inner portion 32a.

The accommodation member 32 includes a shaft member 34 pivotally supported so as to rotate and so as not to move back and forth and extending in the horizontal direction. The process valve body 31 is screwed onto the shaft member 34. An operation member 35 attached to an end portion of the shaft member 34 protruding outward of the accommodation member 32 is rotatably operated so that the process valve body 31 can slide on the accommodation member 32.

Next, a boring machine 7 is hermetically connected to the open end portion 5c of the neck portion 5d. The boring machine 7 mainly includes an attachment flange cylinder 71, a cutter 72 configured to drill the fluid pipe 1, a drive motor 74 configured to rotate the cutter 72 in the attachment flange cylinder 71, and an advancement/retreat mechanism 73 configured to move the cutter 72 back and forth in the upper-lower direction. The cutter 72 is formed in a bottomed cylindrical shape with a smaller diameter than that of the fluid pipe 1, and at a tip end thereof, includes a hole saw 72a having a cutting blade along a circumferential direction and a center drill 72b arranged coaxially with the rotation axis of the hole saw 72a and protruding beyond the cutting blade. Note that the cutter 72 is arranged concentrically with the open end portion 5c of the neck portion 5d of the housing 5, and can be inserted into the neck portion 5d of the housing 5 from the open end portion 5c side to move at least to a position at which the cutter 72 penetrates a pipe wall of a pipe top portion of the fluid pipe 1.

The steps of attaching the boring machine 7 will be described. A flange portion 75 formed at a tip end of the attachment flange cylinder 71 is, by multiple fastening members 77, fastened to the flange portion 5e of the open end portion 5c of the neck portion 5d in the circumferential direction.

The seal member is provided between an upper end surface of the flange portion 5e of the neck portion 5d and a lower end surface of the flange portion 75 of the attachment flange cylinder 71, and closely contacts the flange portion 75 of the attachment flange cylinder 71 to seal the attachment flange cylinder 71 of the boring machine 7 and the neck portion 5d of the housing 5 in such a fastened state.

Note that the process of connecting the process valve device 3 to the opening portion 5b of the neck portion 5d and the process of connecting the boring machine 7 to the open end portion 5c of the neck portion 5d are not limited to the above-described order, and the process of connecting the process valve device 3 may be performed after the process of connecting the boring machine 7 or these connection processes may be simultaneously performed in parallel.

Next, the step of drilling the fluid pipe 1 by the boring machine 7 will be described. First, in a state in which the process valve body 31 of the process valve device 3 is arranged in the accommodation inner portion 32a of the accommodation member 32 and the housing 5 is opened, the cutter 72 is rotated by the drive motor 74 of the boring machine 7, and is moved downwardly by the advancement/retreat mechanism 73. In this manner, the pipe wall of the pipe top portion of the fluid pipe 1 is drilled in the uninterrupted flow state.

At this point, a not-shown ball valve attached to the communication opening portion 17 (see FIGS. 2A to 2C) formed at the side surface of the neck portion 5d as an opening communicating with the inside of the housing 5 is opened, for example. In this manner, chips caused upon drilling are discharged to the outside together with fluid. Note that as described later, the communication opening portion 17 is used as a bypass for water charging upon insertion of the fluid control valve 10. The above-described ball valve is detached later in the uninterrupted flow state, and such a portion is sealed by the opening/closing plug 18 shown in FIG. 9.

Referring back to FIG. 3, when the fluid pipe 1 is cut by the cutter 72, a cut piece 1d of the pipe top portion cut from the fluid pipe 1 is held in the hole saw 72a. Although not shown in the figure, the cutter 72 and the cut piece 1d are together pulled up into the attachment flange cylinder 71, and the housing 5 is closed by the process valve body 31 of the process valve device 3. In this manner, the process of drilling the fluid pipe 1 is completed.

Figure 4:
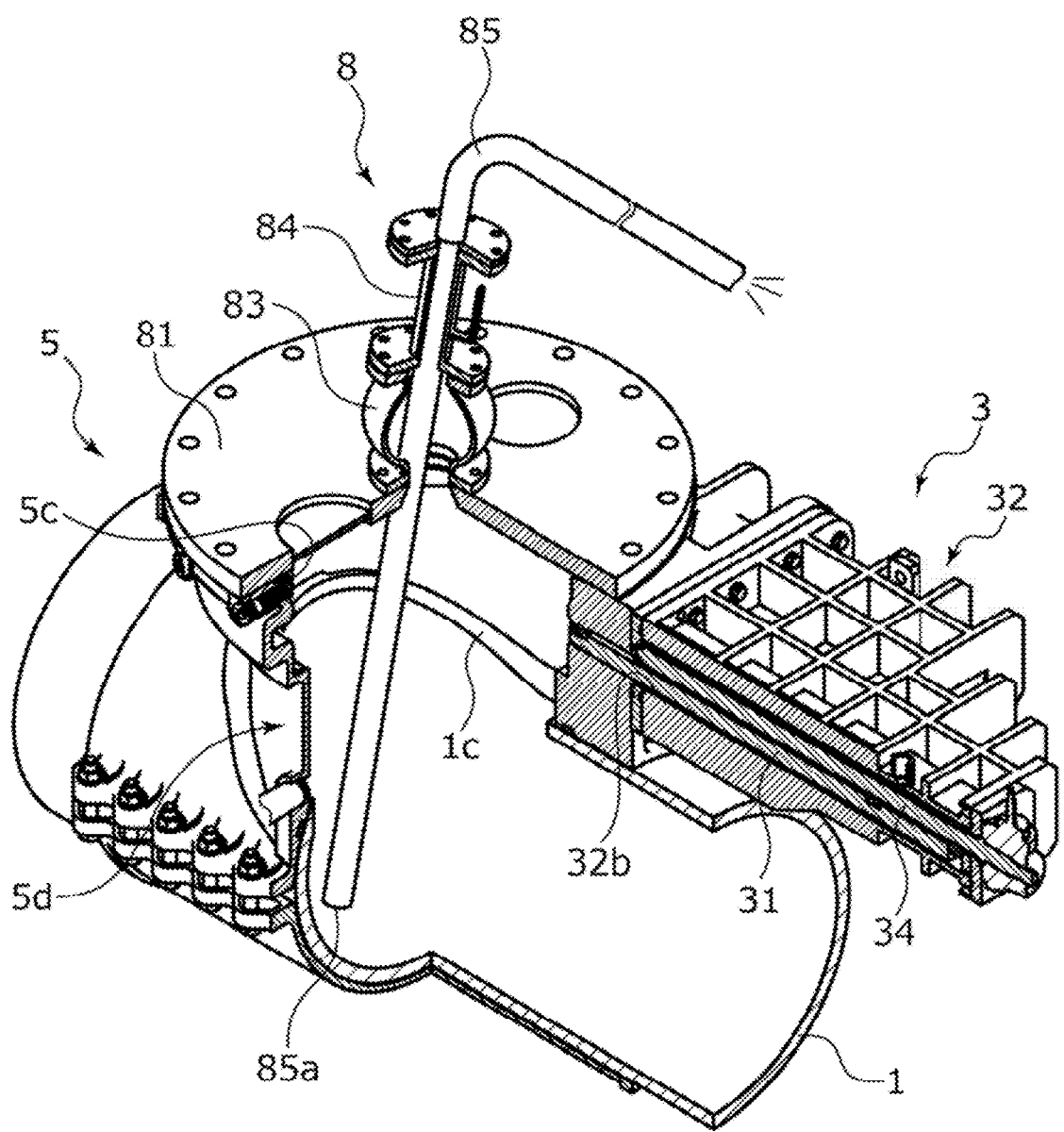
FIG. 4 is a partial sectional perspective view showing a situation where chips are discharged by a discharger.

Next, the process of removing the boring machine 7 is performed in a state in which the housing 5 is hermetically closed by the process valve body 31 of the process valve device 3, and as shown in FIG. 4, a discharger 8 configured to discharge the chips caused upon drilling is, instead of the boring machine 7, connected to the open end portion 5c of the neck portion 5d.

As shown in FIG. 4, the discharger 8 mainly includes an attachment flange plate 81 attached to the open end portion 5c of the neck portion 5d in a fixed manner and opening at the center, a flexible cylinder 83 connected to the opening portion at the center of the attachment flange plate 81 and formed of an elastic member, an operation cylinder 84 connected to an upper end of the flexible cylinder 83, and a discharging pipe 85 hermetically inserted into the attachment flange plate 81, the flexible cylinder 83, and the operation cylinder 84. A back end side of the discharging pipe 85 protrudes outward of the operation cylinder 84, and is connected to a not-shown on-off valve configured to open/close the discharging pipe 85.

Note that the attachment flange plate 81 of the discharger 8 and the open end portion 5c of the neck portion 5d are fastened by not-shown multiple fastening members in the circumferential direction as in the attachment flange cylinder 71 of the boring machine 7 and the open end portion 5c of the neck portion 5d as described above.

Next, the step of discharging the chips by the discharger 8 will be described. The on-off valve (not shown) connected to the back end side of the discharging pipe 85 is brought into an open state so that the chips in the fluid pipe 1 and the housing 5 can be discharged together with fluid. At this point, the operation cylinder 84 coaxially fitted onto the discharging pipe 85 is gripped to freely tilt the discharging pipe 85 with respect to the attachment flange plate 81 by means of elastic deformation of the flexible cylinder 83, and in this manner, a suction port 85a at a tip end of the discharging pipe 85 can be moved to a desired position in the fluid pipe 1 or the housing 5. Thus, even if the chips are scattered throughout the fluid pipe 1 and the housing 5, the substantially total amount of chips can be discharged.

Next, the process of removing the discharger 8 is performed in a state in which the housing 5 is closed by the process valve body 31 of the process valve device 3, and as shown in FIGS. 5 to 8, the fluid control valve 10 configured to control fluid in the pipe is, instead of the discharger 8, connected to the open end portion 5c of the neck portion 5d.

Figure 5:
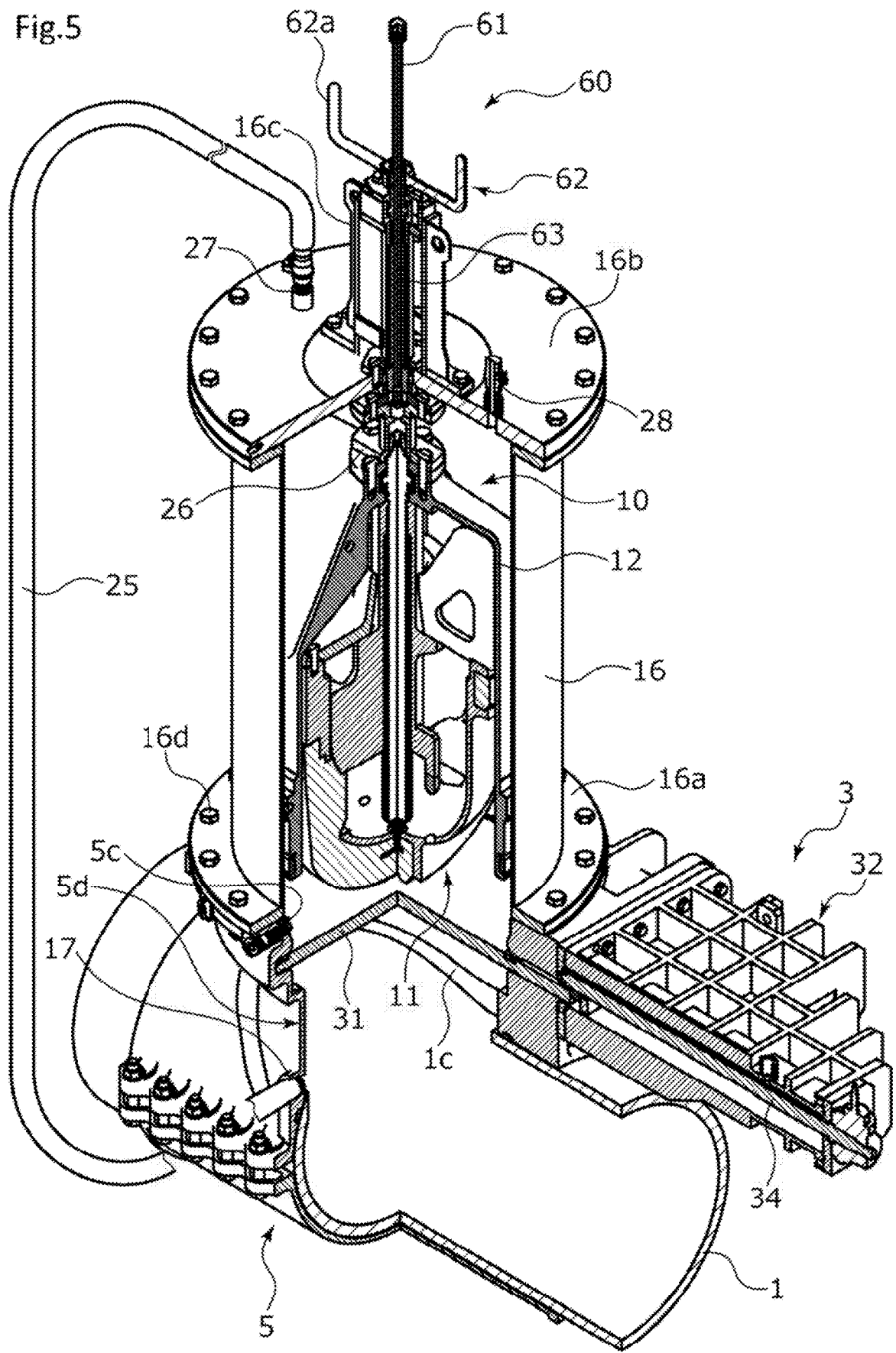
FIG. 5 is a partial sectional perspective view showing a situation where an inserting machine accommodating a fluid control valve is attached to the housing divided by a process valve body.

In advance of attachment of the fluid control valve 10, a flange portion 16a formed at a lower end of an accommodation cylinder 16 accommodating the fluid control valve 10 such that the fluid control valve 10 is movable in the upper-lower direction is, as shown in FIGS. 5 and 6, hermetically connected to the open end portion 5c of the neck portion 5d by multiple fastening members 16d in the circumferential direction. The accommodation cylinder 16 is formed in such a bottomed cylindrical shape that the accommodation cylinder 16 opens at the lower end and is closed at an upper portion by a closing lid 16b having a through-hole at the center. A communication opening portion 27 allowing communication between the inside and the outside of the accommodation cylinder 16 is formed at the closing lid 16b, and the ball valve is constantly screwed into the communication opening portion 27.

In the accommodation cylinder 16, an inserting machine 60 configured to assembly the fluid control valve 10 from the outside of the accommodation cylinder 16 such that the fluid control valve 10 is movably operable and detachable in the upper-lower direction is provided as an insertion means for inserting the fluid control valve 10 into the housing 5. The inserting machine 60 extends to penetrate the center of the upper portion of the accommodation cylinder 16 in the upper-lower direction, and in this order from such a center side, mainly includes an extending rod 61, an operation lever 62, and an insertion cylinder 63.

More specifically, as shown in FIGS. 5 to 8, the extending rod 61 is, at a lower end thereof, screwed into an attachment tool 26 attached to an upper end of a valve housing 12 of the fluid control valve 10 (particularly see FIG. 8A), and at an upper end thereof, extends upward of the accommodation cylinder 16. The operation lever 62 fitted onto the extending rod 61 is pivotally supported on an upper cylindrical portion 16c forming the accommodation cylinder 16 and covering the through-hole of the closing lid 16b so as to rotate and so as not to move in an axial direction, and at an upper end thereof, includes a gripping portion 62a for rotary operation. Further, the insertion cylinder 63 fitted onto the operation lever 62 is pivotally supported on the upper cylindrical portion 16c so as not to rotate and so as to move in the axial direction, and a lower end portion 63a of the insertion cylinder 63 is, in the upper-lower direction, sandwiched by the attachment tool 26 and a flange portion 61a of the extending rod 61. The insertion cylinder 63 includes an internal thread portion 63b screwed with an external thread portion 62c of the operation lever 62.

Figures 6A, 6B:
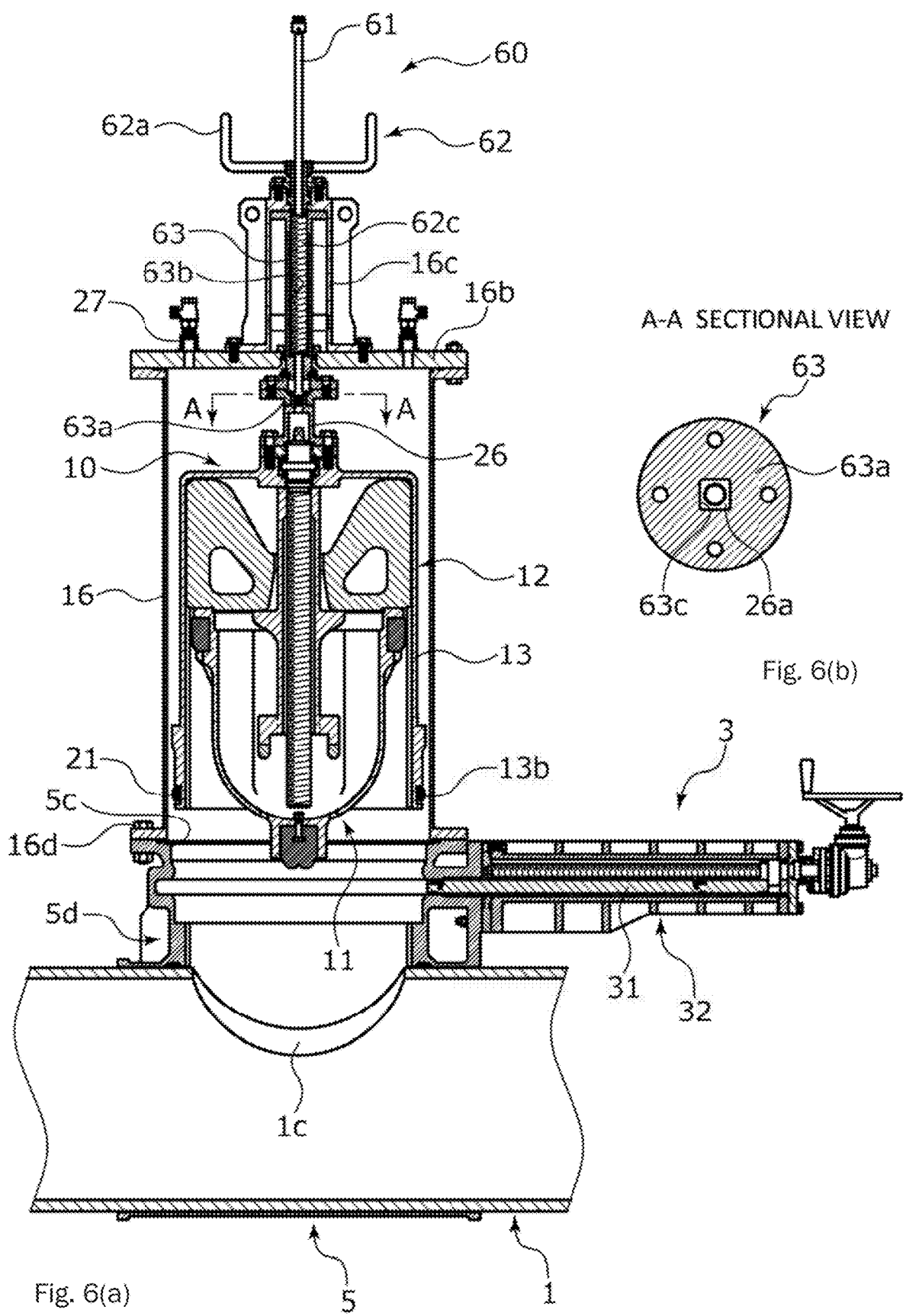
FIG. 6A is a front sectional view showing a situation where the fluid control valve is inserted by the inserting machine.
FIG. 6B is an A-A sectional view of FIG. 6A.

As shown in FIG. 6B, a substantially quadrangular through-hole 63c as viewed in plane is formed at the lower end portion 63a of the insertion cylinder 63, and a protruding end portion 26a of the attachment tool 26 protruding in a substantially quadrangular shape as viewed in plane is fitted in the through-hole 63c to complement the through-hole 63c. With this configuration, movement of the fluid control valve 10 to which the attachment tool 26 is attached is restricted in the circumferential direction relative to the insertion cylinder 63. Note that the planer shapes of the through-hole 63c of the insertion cylinder 63 and the protruding end portion 26a of the attachment tool 26 complementing the through-hole 63c are not limited to the substantially quadrangular shapes, and it may only be required that these shapes are non-circular shapes such as a rectangular shape, an oval shape, and an oval coin shape.

Figure 7:
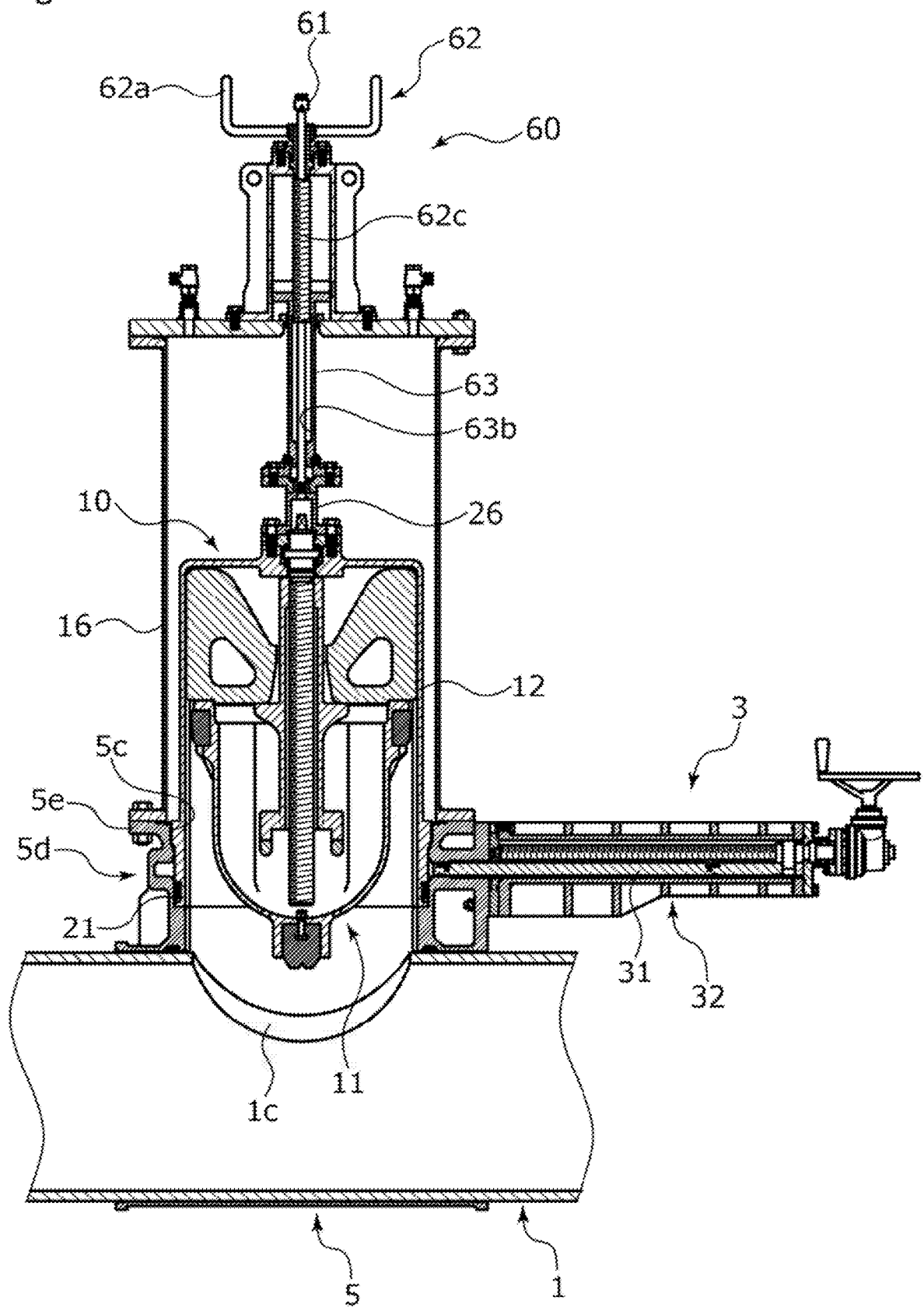
FIG. 7 is a front sectional view showing a situation where installation of the fluid control valve has been completed by the inserting machine.

As shown in FIGS. 5 to 7, the fluid control valve 10 mainly includes the valve body 11 (see FIGS. 9 and 10) vertically moving through a hole 1c drilled at the fluid pipe 1 to open/close the pipe and the valve housing 12 accommodating the valve body 11 such that the valve body 11 is movable in the upper-lower direction and having a peripheral side portion 13 opening at a lower end. At the valve housing 12, a recessed portion 13b is formed across the entire circumference of an outer peripheral surface of the peripheral side portion 13 on a lower end side thereof. A sealing member 21 is provided in the recessed portion 13b. Note that a specific structure of the fluid control valve 10 will be described later in detail.

Next, the step of placing the fluid control valve 10 will be described. First, as shown in FIG. 5, in a state in which the accommodation cylinder 16 accommodating the fluid control valve 10 inside is hermetically connected to the open end portion 5c of the housing 5 as described above, the communication opening portion 17 provided at the neck portion 5d of the housing 5 below the process valve body 31 and the communication opening portion 27 provided at the closing lid of the accommodation cylinder 16 above the process valve body 31 communicate, before opening of the process valve body 31, with each other by a connection hose 25. With this configuration, fluid in the fluid pipe 1 is gradually introduced into the accommodation cylinder 16 by the pressure of such fluid through the communication opening portion 17, the connection hose 25, and the communication opening portion 27.

The fluid in the fluid pipe 1 is introduced into the accommodation cylinder 16 as described above, and therefore, the inside of the accommodation cylinder 16 and the inside of the fluid pipe 1 can be adjusted to the same pressure before opening of the process valve body 31. Alternatively, adjustment to the same pressure may be performed by communication through the connection hose 25 after water charging has been performed by opening of the closing lid 16b with the accommodation cylinder 16 being hermetically connected to the open end portion 5c of the housing 5 or after water charging has been performed using the communication opening portion 27 with the accommodation cylinder 16 being hermetically connected.

At this point, an air ventilation hole 28 openably provided at the closing lid 16b of the accommodation cylinder 16 is opened to release air remaining in the accommodation cylinder 16 to the outside. With this configuration, air in the housing 5 can be discharged when communication with the inside of the housing 5 divided by the process valve body 31 is made, and therefore, the inside of the housing 5 can be filled with fluid in the pipe.

Next, as shown in FIGS. 6A and 6B, the process valve body 31 is opened, and the fluid control valve 10 in the accommodation cylinder 16 is placed facing the housing 5 therebelow. More specifically, the gripping portion 62a of the operation lever 62 of the inserting machine 60 as described above is rotatably operated in a forward rotation direction, thereby downwardly moving the insertion cylinder 63 into which the operation lever 62 is screwed. In association with such downward movement of the insertion cylinder 63, pressing force is downwardly provided to the fluid control valve 10 through the attachment tool 26, thereby gradually downwardly moving the fluid control valve 10 in the neck portion 5d. Note that the extending rod 61 screwed into the attachment tool 26 follows the fluid control valve 10 to move downwardly.

At this point, the inside of the accommodation cylinder 16 is adjusted to the same pressure as that of the inside of the fluid pipe 1 as described above, and there is no pressure difference. Thus, the fluid control valve 10 can be pressed with a small pressing force. For example, pressing may be assisted in such a manner that a water pressure pump is connected to the communication opening portion 27 to bring the inside of the accommodation cylinder 16 (the outside of the open end portion 5c) into a high pressure.

As shown in FIG. 7, the fluid control valve 10 is downwardly pressed to an installation position at which the sealing member 21 closely contacts an inner peripheral surface of the neck portion 5d beyond the opening portion 5b. At such an installation position, pressing bolts 5f (see FIG. 9) provided for temporal fixing at the flange portion 5e of the neck portion 5d are screwed in an inner diameter direction, and in this manner, tip ends of the pressing bolts 5f are fitted in a recessed portion formed at a projecting portion 13d (see FIG. 9) protruding to an outer diameter side of the peripheral side portion 13 of the valve housing 12. Thus, upward detachment and turning of the fluid control valve 10 inserted into the neck portion 5d of the housing 5 are restricted relative to the housing 5.

Figure 8C:
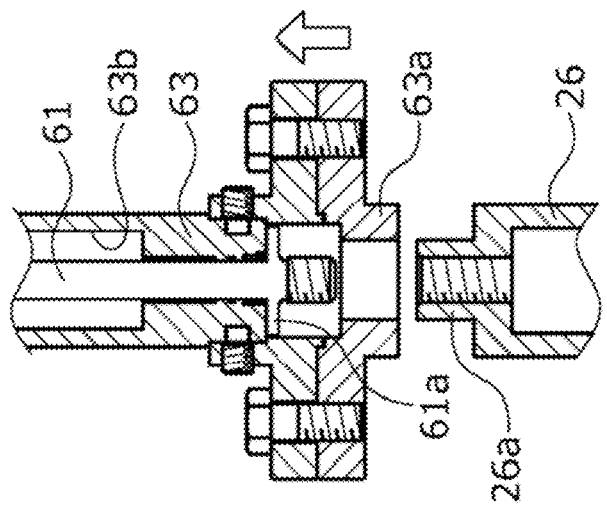
FIGS. 8A to 8C are schematic views showing the steps of detaching the inserting machine from the fluid control valve.
Figure 8B:
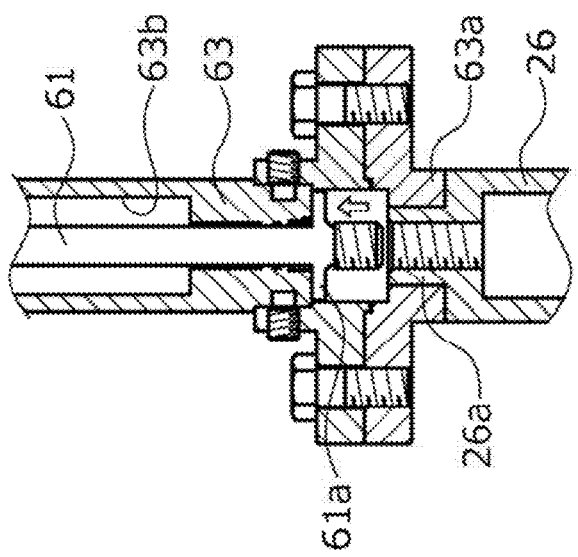
Figure 8A:
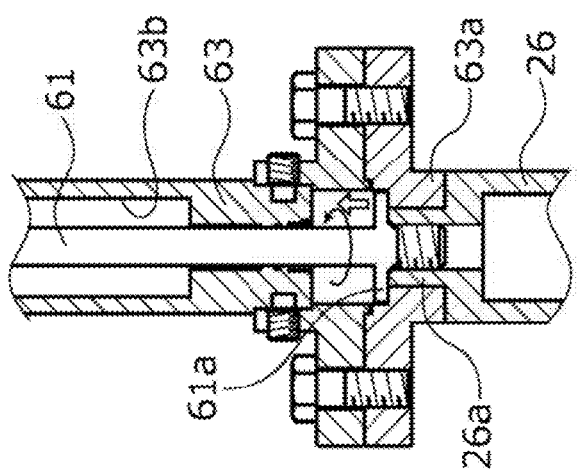

After the fluid control valve 10 has been placed as described above, the above-described inserting machine 60 is operated to detach the accommodation cylinder 16 assembled with the fluid control valve 10. More specifically, as shown in FIGS. 8A to 8C, the extending rod 61 screwed into the attachment tool 26 is first turned with, e.g., a not-shown turning tool being fitted onto the upper end of the extending rod 61, and in this manner, is detached from the attachment tool 26. Next, the gripping portion 62a of the operation lever 62 is rotatably operated in a reverse rotation direction, and the insertion cylinder 63 screwed onto the operation lever 62 is moved upwardly. In this manner, the lower end portion 63a of the insertion cylinder 63 is detached from the protruding end portion 26a of the attachment tool 26 fitted in the substantially quadrangular shape as viewed in plane.

After the inserting machine 60 has been operated and detached from the fluid control valve 10 as described above, fluid, which has been introduced into the accommodation cylinder 16, in the pipe is discharged by a not-shown drain portion, and the accommodation cylinder 16 is detached from the housing 5 together with the inserting machine 60.

At the installation position of the fluid control valve 10, a not-shown through-hole penetrating the valve housing 12 from the inside to the outside thereof and normally closed by, e.g., an opening/closing plug may be in an open state such that air remaining in the valve housing 12 of the fluid control valve 10 in a sealed state is released to the outside. The through-hole described herein is preferably formed in the vicinity of the upper end of the valve housing 12, and with this configuration, the substantially total amount of air in the valve housing 12 can be released to the outside.

The process valve device 3 attached to the opening portion 5b of the housing 5 is sequentially detached. At this point, the inner peripheral surface of the neck portion 5d below the opening portion 5b is sealed by the sealing member 21, and therefore, leakage of inner fluid is prevented even when the opening portion 5b is opened. Thus, the process valve device 3 can be detached without the need for sealing by the valve body 11, and there is no probability of aging of the process valve device 3. Moreover, a closing ring 40 formed in an annular shape is attached to the flange portion 5e of the open end portion 5c of the neck portion 5d with multiple fastening members 41 in the circumferential direction, and the projecting portion 13d of the valve housing 12 is locked at the closing ring 40. In this manner, detachment of the valve housing 12 is reliably prevented.

Figure 9:
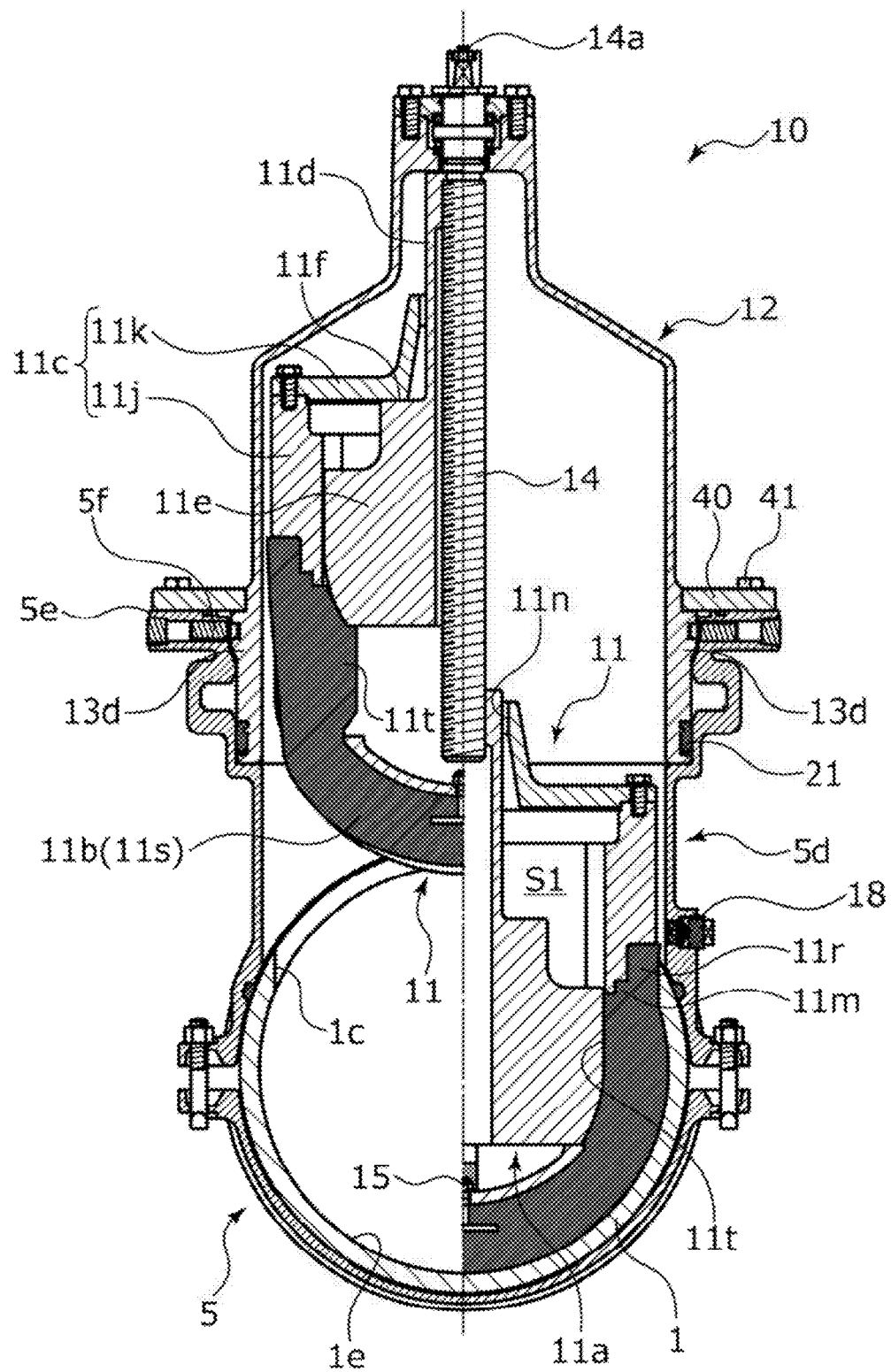
FIG. 9 is a schematic side sectional view showing a valve open state and a valve close state of the fluid control valve in the first embodiment.
Figure 10:
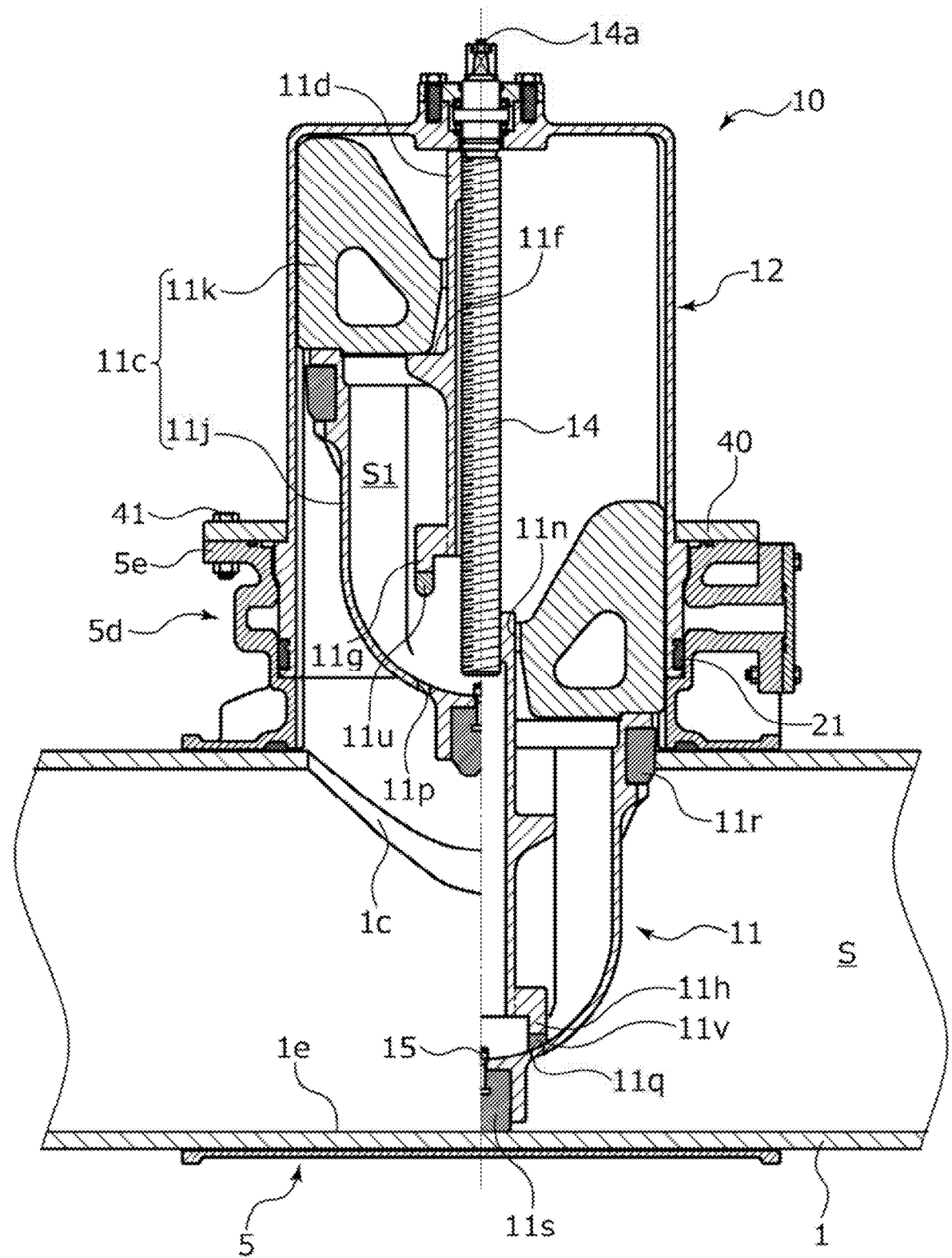
FIG. 10 is a schematic front sectional view as in FIG. 9.

Next, the specific structure of the fluid control valve 10 will be described. As shown in FIGS. 9 and 10, a shaft member 14 extending in the upper-lower direction in a state in which the shaft member 14 is pivotally supported so as to rotate and so as not to move back and forth is attached to the valve housing 12, and the valve body 11 is screwed onto the shaft member 14. An operation portion 14a protruding outward (upward) of the valve housing 12 from an upper end of the shaft member 14 is rotatably operated such that the valve body 11 is movable up and down relative to the valve housing 12.

More specifically, the valve body 11 mainly includes an internal thread piece 11a as a movement portion including an internal thread screwed onto the shaft member 14 and provided movably along the shaft member 14, a valve body portion 11c engaging with the internal thread piece 11a, suspending to follow operation of the internal thread piece 11a, and formed of a rigid body such as a metal piece or plastic, a seal portion 11b fixed to an outer surface of the valve body portion 11c and formed of an elastic member, and a fixing member 15 including a bolt/nut molded integrally with the seal portion 11b by, e.g., vulcanization and coupling the seal portion 11b to a bottom portion of the valve body portion 11c.

The internal thread piece 11a includes a cylindrical shaft portion 11d screwed onto the shaft member 14, projecting portions lie projecting from both sides of a lower end portion of the cylindrical shaft portion 11d in a direction perpendicular to a pipe axis direction of the fluid pipe 1, a support portion 11f supporting the valve body portion 11c, and a first plug portion 11g and a second plug portion 11h as a switching unit or plug portions provided apart from each other in the pipe axis direction at a lower end of the cylindrical shaft portion 11d. The first plug portion 11g and the second plug portion 11h each include, at lower ends thereof, seal members 11u, 11v formed of elastic bodies.

The valve body portion 11c includes an upwardly-opening side wall portion 11j having a circular shape as viewed in plane and having a U-shape as viewed in a side cross section and a discoid lid portion 11k closing an opening of the side wall portion 11j. Opening portions him are formed on both sides of the side wall portion 11j in a direction perpendicular to the pipe axis direction of the fluid pipe 1. A through-hole 11n into which an upper end portion of the cylindrical shaft portion 11d is inserted is formed at a center portion of the lid portion 11k, and a peripheral edge portion of the lid portion 11k is, with a bolt, fixed to an edge portion of the upper opening of the side wall portion 11j.

The valve body portion 11c is brought into a state in which the valve body portion 11c suspends from the internal thread piece 11a in such a manner that the lid portion ilk is placed on the support portion 11f of the internal thread piece 11a in a valve open state in which the valve body 11 is accommodated in the valve housing 12. Specifically, the valve body portion 11c is supported on the internal thread piece 11a with relative movement of the valve body portion 11c in the upper-lower direction being allowed.

A first communication hole 11p and a second communication hole 11q provided apart from each other in the pipe axis direction are formed at the bottom portion of the valve body portion 11c. The first communication hole 11p causes the upstream side of the valve body 11 in the fluid pipe 1 and a hollow inner space S1 in the valve body portion 11c to communicate with each other. Moreover, the second communication hole 11q allows the downstream side (a predetermined section S side) of the valve body 11 in the fluid pipe 1 and the inner space S1 of the valve body portion 11c to communicate with each other.

The seal portion 11b includes a peripheral portion 11r of an upper portion extending along an inner peripheral surface of the hole 1c and a U-shaped portion 11s of a lower portion extending along an inner peripheral surface 1e of the fluid pipe 1. The peripheral portion 11r and the U-shaped portion 11s are made of rubbers with different degrees of hardness, and are preferably molded integrally with and attached to the fixing member 15 by, e.g., bonding or vulcanization. With this configuration, insertion of the valve body 11 is facilitated while the probability of the U-shaped portion 11s being drifted by a flow velocity is prevented. Specifically, the peripheral portion is preferably designed softer and the U-shaped portion is preferably designed harder, and these portions are preferably integrally formed.

The U-shaped portion his is arranged to hermetically cover the opening portions him of the valve body portion 11c, and portions of the U-shaped portion his near the opening portions 11m form bulging portions lit bulging to an inner space S1 side of the valve body portion 11c.

The valve body 11 moves into the pipe from the valve open state in which the valve body 11 is accommodated in the valve housing 12 through the hole 1c of the fluid pipe 1 below the valve body 11 by rotation of the shaft member 14 as described above. Then, the seal portion 11b comes into close contact with the hole 1c of the fluid pipe 1 across the entire circumference of the inner peripheral surface 1e. Thus, a valve close state in which a flow passage in the pipe is fully blocked can be brought, and the flow of fluid can be controlled. A valve close state (position) in which the flow passage remains, without the need for fully blocking the flow passage, to such an extent that the construction on the downstream side is allowed may be brought. This case is also included in a hermetically-blocked or blocked state. With this configuration, a downstream-side pressure adjustment step can be promoted.

The internal thread piece 11a simultaneously moves down with the valve body portion 11c suspending from the internal thread piece 11a in the beginning of transition from the valve open state to the valve close state. When the seal portion 11b contacts a pipe inner peripheral bottom portion, the internal thread piece 11a greatly moves down relative to the seal portion 11b and the valve body portion 11c, and the projecting portions 11e on both sides of the internal thread piece 11a pushes out the bulging portions 11t of the seal portion 11b in the outer diameter direction. In this manner, the flow of fluid in the fluid pipe 1 is reliably blocked. That is, the projecting portions lie of the internal thread piece 11a and the bulging portions lit of the seal portion 11b form an expansion unit capable of pushing out and expanding the seal portion 11b in a width direction. Specifically, in a fluid pipe with a great diameter, the inner diameter of a pipe inner surface greatly varies according to a pipe type, rust-proofing treatment, and an allowable pipe manufacturing tolerance, and sealability of the seal portion 11b can be enhanced by expansion of the seal portion 11b by the expansion unit. Moreover, pressing force on the inner peripheral surface 1e by expansion of the seal portion 11b by the expansion unit leads to stability of the valve close position of the valve body 11.

Further, the fixing member 15 forms a core portion in the seal portion 11b as an elastic body, and prevents the probability of the U-shaped portion 11s being drifted by the flow velocity. Note that the seal portion 11b may be vulcanized or vulcanized and coated to cover the entirety or part of the valve body portion 11c.

Next, the step of bringing the valve body 11 from the valve close state to the valve open state will be described.

Figure 11:
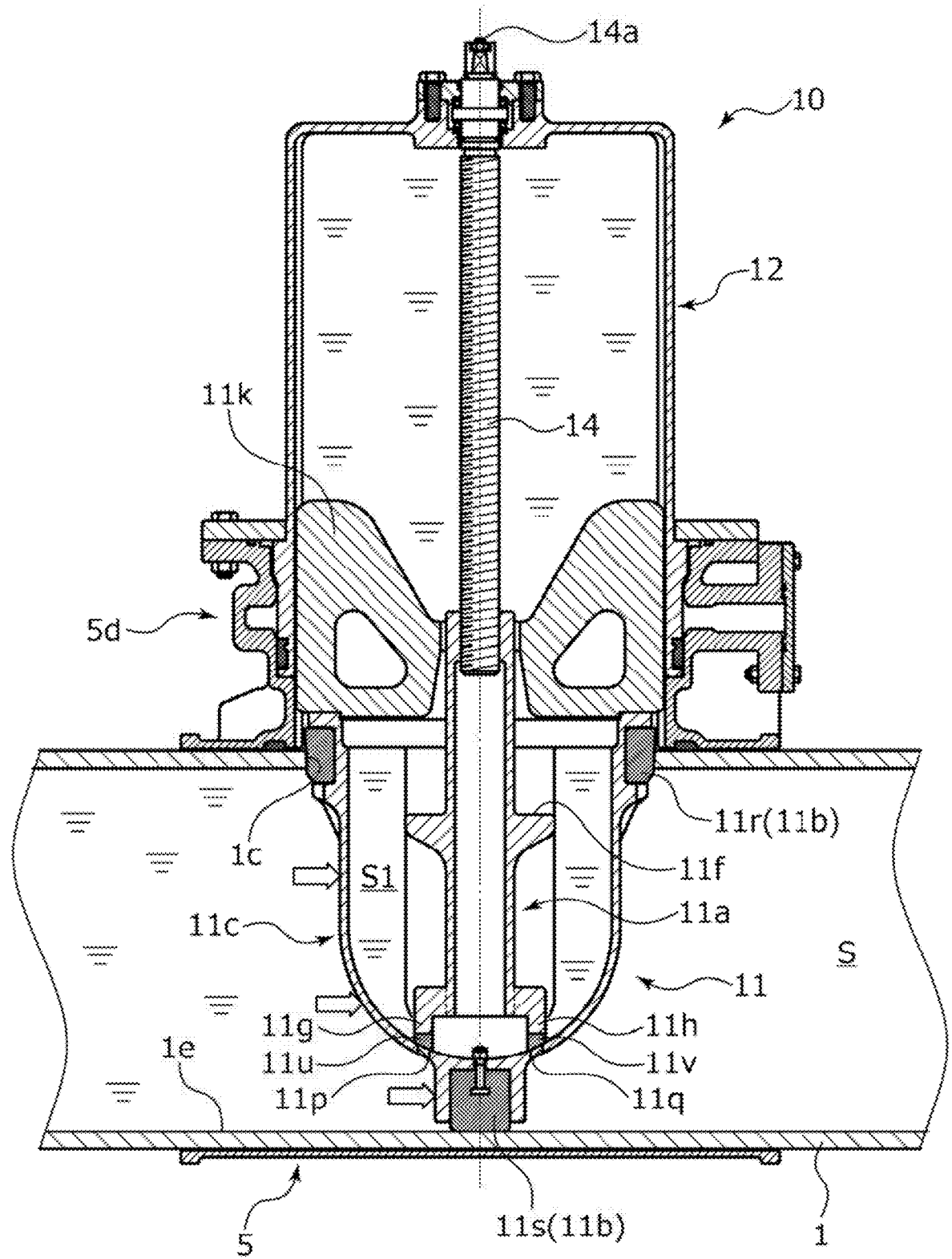
FIG. 11 is a front sectional view showing the fluid control valve in the valve close state.

As shown in FIG. 11, in the valve close state of the valve body 11, the internal thread piece 11a moves down relative to the seal portion 11b and the valve body portion 11c, the first plug portion 11g and the second plug portion 11h are pressed against the bottom portion of the valve body portion 11c, and the first communication hole 11p and the second communication hole 11q of the valve body portion 11c are hermetically closed. That is, the first communication hole 11p and the second communication hole 11q are in a non-communication state. As described above, in the valve close state of the valve body 11, part of the predetermined section S in the fluid pipe 1 can be cut in a state in which the flow of fluid in the predetermined section S is blocked (see FIG. 1B). Note that the first communication hole 11p and the second communication hole 11q may be provided at a side portion of the valve body portion 11c, and in this case, the first plug portion 11g and the second plug portion 11h may be provided at positions corresponding to these holes.

In addition, in the present embodiment, the first communication hole 11p and the second communication hole 11q are formed as through-holes that are open in a substantially circular shape with a small diameter, but the present invention is not limited thereto. Although not particularly shown in the figure, the first communication hole 11p and the second communication hole 11q may be formed as openings in a non-circular shape such as a substantially crescent shape or a slit shape that is wide in a pipe radial direction. Thus, the stable flow of the pipe fluid can be secured, and the degree of freedom in designing the communication holes can be increased.

Further, in the present embodiment, the seal members 11u and 11v provided at the lower ends of the first plug portion 11g and the second plug portion 11h have minimum required sizes sufficient to seal the first communication hole 11p and the second communication hole 11q, and are formed in a substantially cylindrical shape of which a lower end is a curved surface, but the present invention is not limited thereto. Although not particularly shown in the figure, the seal members 11u and 11v may be shaped such that center portions of the seal members 11u and 11v close the first communication hole 11p and the second communication hole 11q and peripheral portions of the seal members 11u and 11v contact an inner surface of a lower end of the side wall portion 11j at peripheral edges of the first communication hole 11p and the second communication hole 11q. Thus, even when the seal members 11u and 11v are moved relative to the first communication hole 11p and the second communication hole 11q, sealability can be secured.

Further, in the present embodiment, the seal members 11u and 11v provided at the lower ends of the first plug portion 11g and the second plug portion 11h are separately provided with a minimum required size so as to individually seal the first communication hole 11p and the second communication hole 11q, but the present invention is not limited thereto. Although not particularly shown in the figure, a seal member formed of an integral and large elastic body (hereinafter, referred to as a large seal member) may be provided at the lower ends of the first plug portion 11g and the second plug portion 11h, and the large seal member may be configured to collectively seal the first communication hole 11p and the second communication hole 11q. In addition, in this case, a lower end of the large seal member preferably has a raised outer curved surface along a recessed inner curved surface of the lower end of the side wall portion 11j of the valve body portion 11c. Thus, even when the valve body portion 11c is inclined due to the influence of the fluid, the large seal member follows the inclination of the valve body portion 11c to closely contact the inner surface of the lower end of the side wall portion 11j, so that the first communication hole 11p and the second communication hole 11q can be reliably sealed and a load on the shaft member 14 screwed onto the cylindrical shaft portion 11d can also be suppressed.

In addition, particularly, when such a large seal member is used, the large seal member may be joined to the lower end portion of the cylindrical shaft portion 11d with a bolt or the like and thus, the attachment strength of the large seal member can be increased.

After cutting or disassembly of the predetermined section S of the fluid pipe 1, pipe fluid with a predetermined fluid pressure (a primary pressure) is present on a branching housing 2 side of the valve body 11 in the fluid pipe 1, and atmospheric air with a lower pressure (a secondary pressure) than that of the pipe fluid is present on the predetermined section S side of the valve body 11. Thus, the valve body 11 is pressed toward the predetermined section S by the fluid pressure (the primary pressure) of the valve body 11 in the fluid pipe 1. Similarly, pipe fluid with a predetermined fluid pressure (a primary pressure) is present on a branching housing 2' side of the valve body 11' in the fluid pipe 1, and atmospheric air with a lower pressure (a secondary pressure) than that of the pipe fluid is present on the predetermined section S side of the valve body 11'. Thus, the valve body 11' is pressed toward the predetermined section S by the fluid pressure (the primary pressure) of the valve body 11' in the fluid pipe 1.

Figure 12:
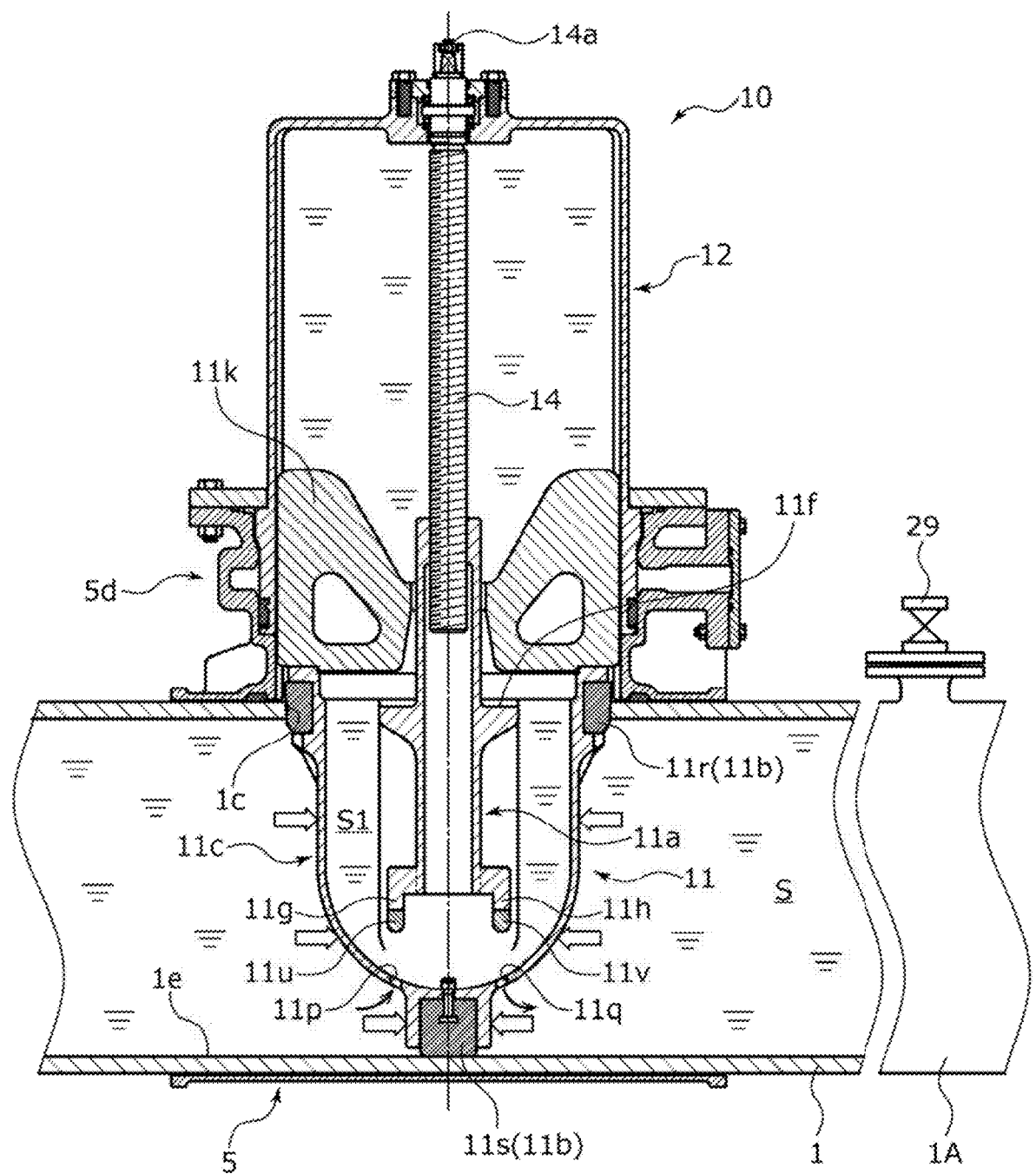
FIG. 12 is a front sectional view showing a situation where a first step of a valve opening step has been performed after the situation of FIG. 11.

Subsequently, as shown in FIG. 12, when the valve body 11 is brought into the valve open state, the operation portion 14a of the shaft member 14 is rotatably operated in a valve opening direction. In the beginning of transition of the valve body 11 from the valve close state to the valve open state, only the internal thread piece 11a relatively moves up in a state in which the seal portion 11b and the valve body portion 11c are arranged at valve close positions (a first step of a valve opening step).

In this manner, the first plug portion 11g and the second plug portion 11h are separated upwardly from the first communication hole 11p and the second communication hole 11q and are opened, and the first communication hole 11p and the second communication hole 11q are brought into a communication state. That is, the first plug portion 11g and the second plug portion 11h form the switching unit configured to switch the first communication hole 11p and the second communication hole 11q between the communication state and the non-communication state.

When the first communication hole 11p and the second communication hole 11q are brought into the communication state, fluid on the upstream side of the valve body 11 in the fluid pipe 1 is introduced into the predetermined section S through the first communication hole 11p, the inner space S1 of the valve body portion 11c, and the second communication hole 11q. In other words, the pressure adjustment step of decreasing a pressure difference between both sides of the valve body 11 in the pipe axis direction in the fluid pipe 1 is started taking the first step of the valve opening step as a trigger. Note that after the first step of the valve opening step, valve opening operation for the valve body 11 is stopped until the pressure adjustment step is completed.

An air ventilation hole 29 is provided at the new fluid pipe 1A connected to and arranged at a portion formed by cutting or disassembly of the predetermined section S, and the air ventilation hole 29 is opened such that air in the new fluid pipe 1A is released to the outside. In this manner, the inside of the predetermined section S can be filled with pipe fluid, and both sides of the valve body 11 in the pipe axis direction in the fluid pipe 1 can be under the same pressure.

Note that the air ventilation hole 29 is preferably provided at the new fluid pipe 1A such that both sides of the valve body 11 in the pipe axis direction are under the same pressure, but is not necessarily provided at the new fluid pipe 1A. More preferably, a pressure meter can be placed at the air ventilation hole 29, and with this configuration, utilization for a water pressure test is also allowed.

When both sides of the valve body 11 in the pipe axis direction are under the same pressure, the pressure adjustment step is completed. Thereafter, the operation of rotating the operation portion 14a of the shaft member 14 in the valve opening direction is resumed. When the operation portion 14a of the shaft member 14 is rotatably operated in the valve opening direction, the internal thread piece 11a first moves up, and the support portion 11f thereof contacts a lower surface of the lid portion 11k of the valve body portion 11c. When the operation portion 14a is further rotatably operated, the internal thread piece 11a and the valve body portion 11c together move up in a state in which the support portion 11f supports the valve body portion 11c (a second step of the valve opening step). In this manner, the valve body 11 is arranged at a retreat position at which the valve body 11 does not interfere with the flow of fluid in the fluid pipe 1, and the fluid pipe 1 and the fluid pipe 1A communicate with each other (an open state of the valve body 11 (see FIGS. 9 and 10)).

As described above, both sides of the valve body 11 in the pipe axis direction in the fluid pipe 1 can be under the same pressure by the pressure adjustment step, and therefore, pressing of the valve body 11 to one side in the pipe axis direction by the fluid pressure is prevented. According to this configuration, a probability that the peripheral portion 11r of the seal portion 11b of the valve body 11 excessively pressure-contacts the inner peripheral surface of the hole 1c and the valve opening operation for the valve body becomes difficult or the valve body is damaged due to friction force between the peripheral portion 11r and the inner peripheral surface of the hole 1c is avoided. That is, the valve opening operation can be smoothly performed for the valve body 11.

At the pressure adjustment step, fluid flowing on the upstream side (one side in the pipe axis direction) with respect to the valve body 11 in the fluid pipe 1 is charged to the predetermined section S side (the other side in the pipe axis direction), and therefore, both sides of the valve body 11 in the pipe axis direction can be easily adjusted to the same pressure.

The valve opening step has the first step of moving the internal thread piece 11a in the valve opening direction relative to the valve body portion 11c in the valve close state and the second step of moving, together with the internal thread piece 11a, the valve body portion 11c and the seal portion 11b in the valve opening direction. The pressure adjustment step is started taking the first step as the trigger, and is completed before the second step is performed. According to this configuration, the pressure adjustment step is completed before the second step of moving the valve body portion 11c in the valve opening direction together with the internal thread piece 11a is performed, and therefore, both sides of the valve body 11 in the pipe axis direction can be reliably under the same pressure when the second step is performed. Moreover, the pressure adjustment step is started taking the first step as the trigger, and therefore, can be completed within a short period of time.

Note that in the present embodiment, the form in which the pressure adjustment step is completed before the second step of the valve opening step is performed has been described as an example, but it may only be required that the pressure adjustment step is started taking the first step as the trigger. The second step may be performed before completion of the pressure adjustment step. In this case, the pressure difference between both sides of the valve body 11 in the pipe axis direction can be reliably decreased.

The valve body portion 11c of the fluid control valve 10 includes the first communication hole 11p having a hollow shape forming the inner space S1 and communicating with an existing fluid pipe 1 side (one side in the pipe axis direction) filled with pipe fluid and the second communication hole 11q communicating with the predetermined section S side (the other side in the pipe axis direction). The valve body 11 has the first plug portion 11g and the second plug portion 11h configured to switch the first communication hole 11p and the second communication hole 11q between the communication state and the non-communication state.

According to this configuration, upon valve closing for the valve body 11, the first communication hole 11p and the second communication hole 11q are closed into the non-communication state by the first plug portion 11g and the second plug portion 11h, and therefore, the flow of fluid in the fluid pipe 1 can be blocked. Upon valve opening for the valve body 11, the first communication hole and the second communication hole are opened into the communication state by the first plug portion 11g and the second plug portion 11h, and therefore, the pressure difference between both sides of the valve body 11 in the pipe axis direction can be decreased. Thus, the valve opening operation can be easily performed for the valve body 11.

The valve body portion 11c is supported on the internal thread piece 11a of the valve body 11 in a state in which relative movement in the direction of operation of the valve body 11 is allowed. According to this configuration, upon valve closing for the valve body 11, the internal thread piece 11a and the valve body portion 11c move toward the inside of the fluid pipe 1. After the U-shaped portion 11s of the seal portion 11b has contacted the inner peripheral surface 1e of the fluid pipe 1, the internal thread piece 11a further moves to expand the U-shaped portion 11s of the seal portion 11b so that the flow of fluid in the fluid pipe 1 can be reliably blocked.

In addition, the first plug portion 11g and the second plug portion 11h are provided at the internal thread piece 11a, and as described above, when the operation of moving the internal thread piece 11a in a valve closing direction relative to the valve body portion 11c arranged at the valve close position is performed for expanding the U-shaped portion 11s, the first communication hole 11p and the second communication hole 11q can be closed by the first plug portion 11g and the second plug portion 11h. In other words, the first communication hole 11p and the second communication hole 11q can be easily closed utilizing the operation of expanding the seal portion 11b by the internal thread piece 11a to reliably block the flow of fluid in the fluid pipe 1.

Upon valve opening for the valve body 11, only the internal thread piece 11a can be retreated while the valve body portion 11c and the seal portion 11b are holding the valve close state, and the first communication hole hip and the second communication hole 11q can be opened by the first plug portion 11g and the second plug portion 11h. Thus, the pressure difference between both sides of the valve body 11 in the pipe axis direction can be decreased.

The operation portion 14a of the shaft member 14 is operated from the outside of the valve housing 12 to move the internal thread piece 11a, and therefore, the process of opening/closing the first communication hole 11p and the second communication hole 11q by the first plug portion 11g and the second plug portion 11h can be easily performed.

The first plug portion 11g and the second plug portion 11h are provided at the lower end in the direction of movement of the internal thread piece 11a, and therefore, movement force in the direction of movement of the internal thread piece 11a is easily transmitted in closing directions of the first plug portion 11g and the second plug portion 11h. Thus, the first communication hole 11p and the second communication hole 11q can be reliably closed.

The first plug portion 11g and the second plug portion 11h are provided at the internal thread piece 11a, and the first communication hole 11p and the second communication hole 11q can be closed by the first plug portion 11g and the second plug portion 11h. This allows double sealing, and the first communication hole 11p and the second communication hole 11q can be reliably brought into the non-communication state.

Note that in the present embodiment, the form in which the first plug portion 11g and the second plug portion 11h are provided at the internal thread piece 11a has been described as an example, but it may only be required that at least either one of the first plug portion 11g or the second plug portion 11h is provided. In this case, either one of the first plug portion 11g or the second plug portion 11h is moved up and down in the valve close state of the valve body 11 so that both sides of the valve body 11 in the pipe axis direction in the fluid pipe 1 can be switched between a communication state and a non-communication state.

Figure 13:
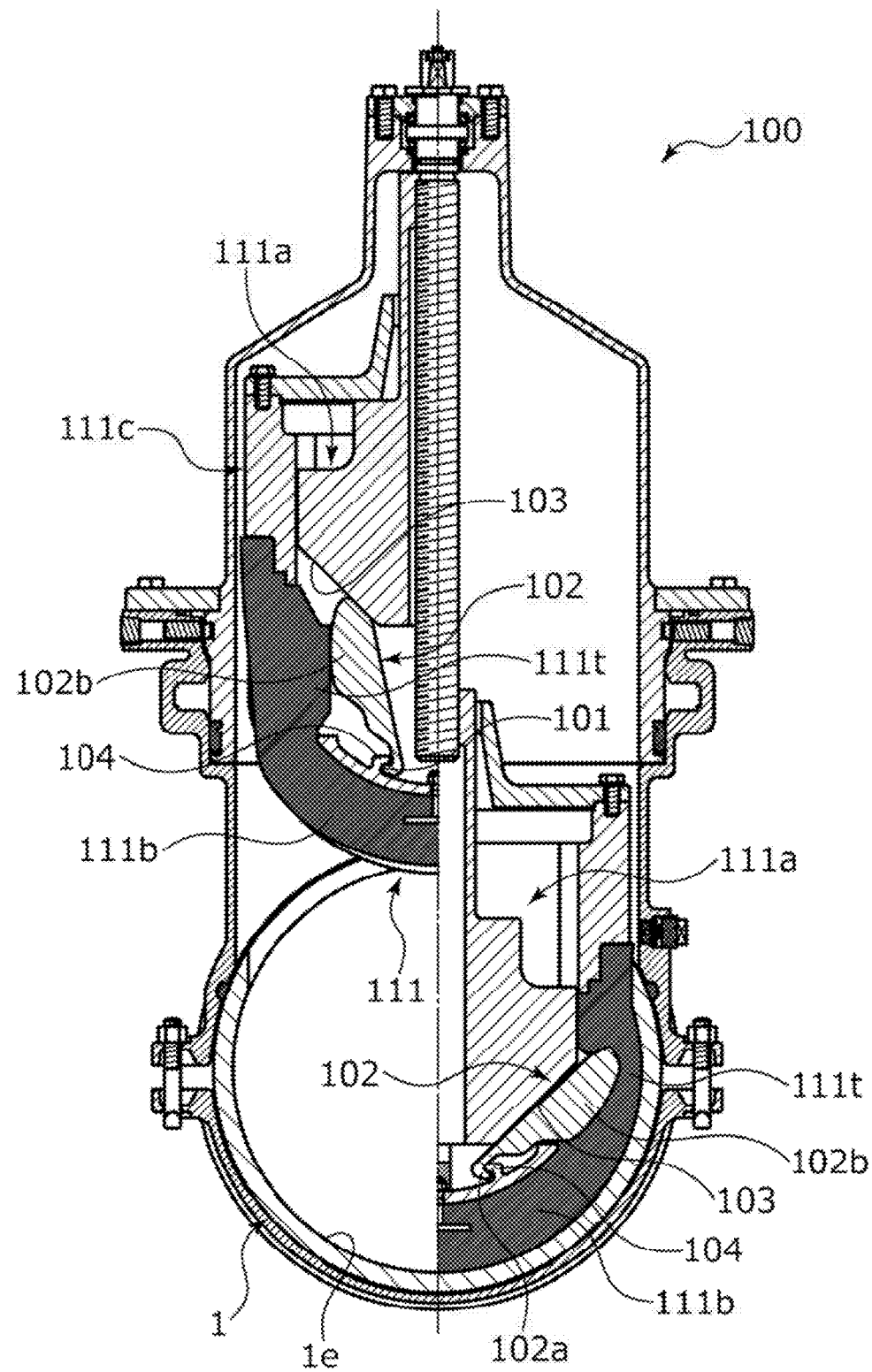
FIG. 13 is a schematic side sectional view showing a first modified example of the first embodiment.

Next, a fluid control valve in a first modified example will be described based on FIG. 13. As shown in FIG. 13, the fluid control valve 100 of the first modified example is configured such that hook-shaped pieces 104 are formed apart from each other in the width direction at a bottom portion of a valve body portion 111c of a valve body 111 and grooves 101 opening facing each other are formed inside the hook-shaped pieces 104. Tip end surfaces of these hook-shaped pieces 104 are raised curved surfaces (hereinafter referred to as raised curved surfaces on a valve body portion 111c side), and inner surfaces of the grooves 101 are recessed curved surfaces (hereinafter referred to as recessed curved surfaces on the valve body portion 111c side).

Movable pieces 102 forming part of the expansion unit are each swingably attached to the grooves 101. Specifically, a lower end portion 102a of the movable piece 102 is in a hook shape, a tip end surface of the lower end portion 102a is a raised curved surface (hereinafter referred to as a raised curved surface on a movable piece 102 side), and an inner-angle-side surface formed by the lower end portion 102a and a base portion 102b of the movable piece 102 is a recessed curved surface (hereinafter referred to as a recessed curved surface on the movable piece 102 side).

The lower end portion 102a of each movable piece 102 is loosely fitted in the groove 101, and therefore, the recessed curved surface on the valve body portion 111c side and the raised curved surface on the movable piece 102 side can slide on each other and the raised curved surface on the valve body portion 111c side and the recessed curved surface on the movable piece 102 side can slide on each other.

Inclined surfaces 103 narrowed downwardly to the center side are formed at a lower end of an internal thread piece 111a.

In a valve open state of the valve body 111, the base portions 102b of the movable pieces 102 are pressed into a standing state against an internal thread piece 111a side by elastic force of bulging portions 111t of a seal portion 111b.

In a valve close state of the valve body 111, the inclined surfaces 103 of the internal thread piece 111a and the movable pieces 102 slide on each other in association with downward movement of the internal thread piece 111a, and the movable pieces 102 are expanded in the width direction. Accordingly, the movable pieces 102 press the bulging portions 111t of the seal portion 111b against the inner peripheral surface 1e of the fluid pipe 1, and therefore, the flow passage in the pipe can be fully blocked.

Figure 14:
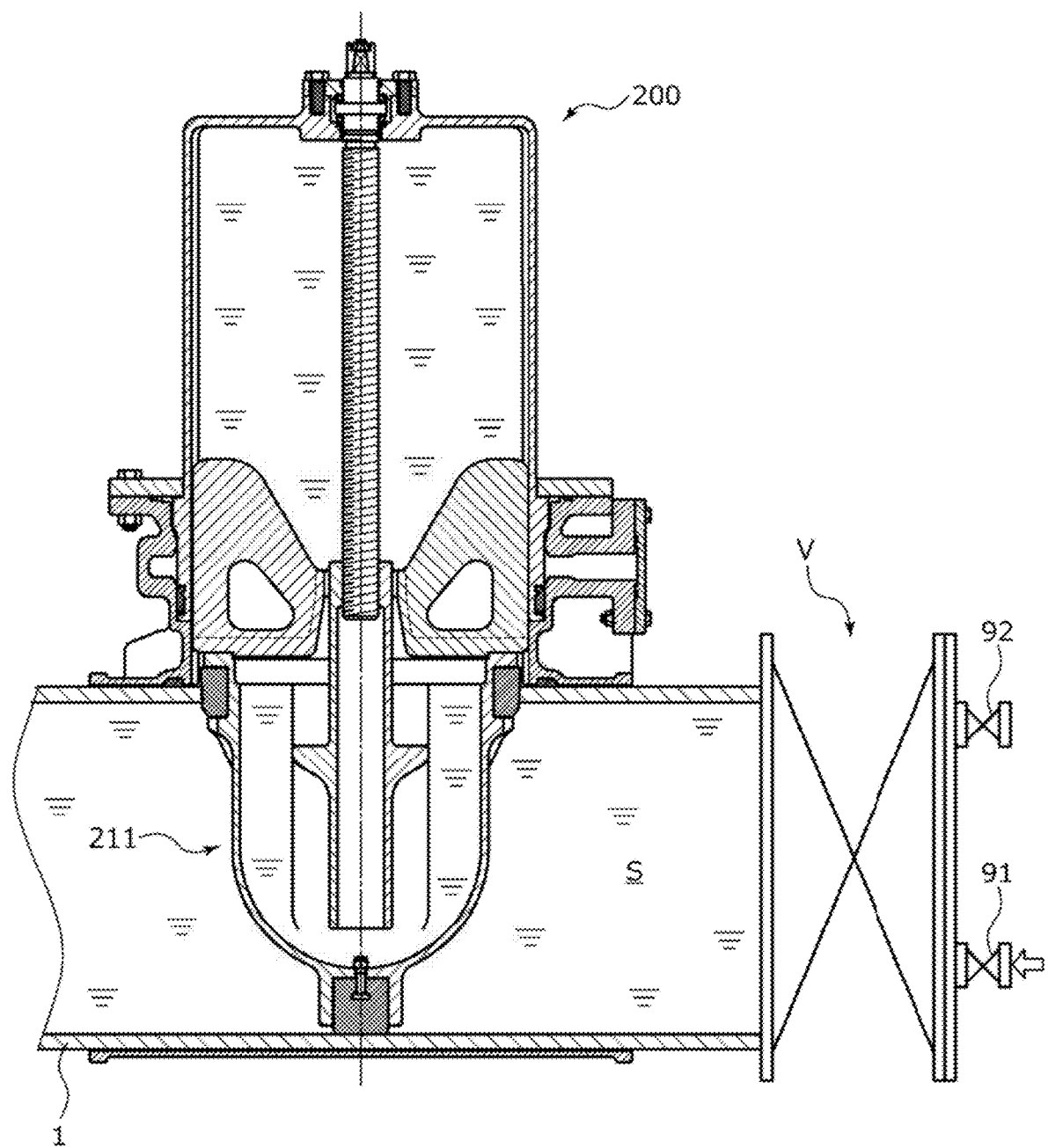
FIG. 14 is a front sectional view showing a second modified example of the first embodiment.

Next, a pressure adjustment step for a fluid control valve in a second modified example will be described based on FIG. 14. As shown in FIG. 14, a valve body 211 of the fluid control valve 200 of the second modified example has the same configuration as that of the fluid control valve 10 of the first embodiment, except that the first plug portion 11g, the second plug portion 11h, the first communication hole 11p, and the second communication hole 11q are not provided.

At the pressure adjustment step for the fluid control valve 200, after cutting or disassembly of the predetermined section S of the fluid pipe 1 (see FIG. 1B), a valve V is connected to the cut opening of the fluid pipe 1. The valve V can close the cut opening of the fluid pipe 1, and is provided with a fluid injection port 91 and an air ventilation port 92.

While air is being vented through the air ventilation port 92 of the valve V from the predetermined section S side with respect to the valve body 211 in the fluid pipe 1, the same fluid as that flowing in the fluid pipe 1 is injected through the fluid injection port 91 for pressurization. In this manner, both sides of the valve body 211 in the pipe axis direction in the fluid pipe 1 can be under the same pressure, or the pressure difference between these sides can be adjusted to a smaller difference. Thus, valve opening operation can be easily performed for the valve body 211. Note that the form in which the same fluid as that flowing in the fluid pipe 1 is injected to the predetermined section S side with respect to the valve body 211 in the fluid pipe 1 through the fluid injection port 91 has been described as an example, but the present invention is not limited to such a form. A different type of fluid from that flowing in the fluid pipe 1 may be injected. The valve V is not necessarily provided. For example, upon piping on the downstream side, a cylinder cap or a cylinder plug may be used, a collar, a coupling, a deformed pipe, a sludge drainage pipe, etc. may be provided, the fluid injection port 91 and the air ventilation port 92 may be provided for these members for pressure adjustment.

Figure 15:
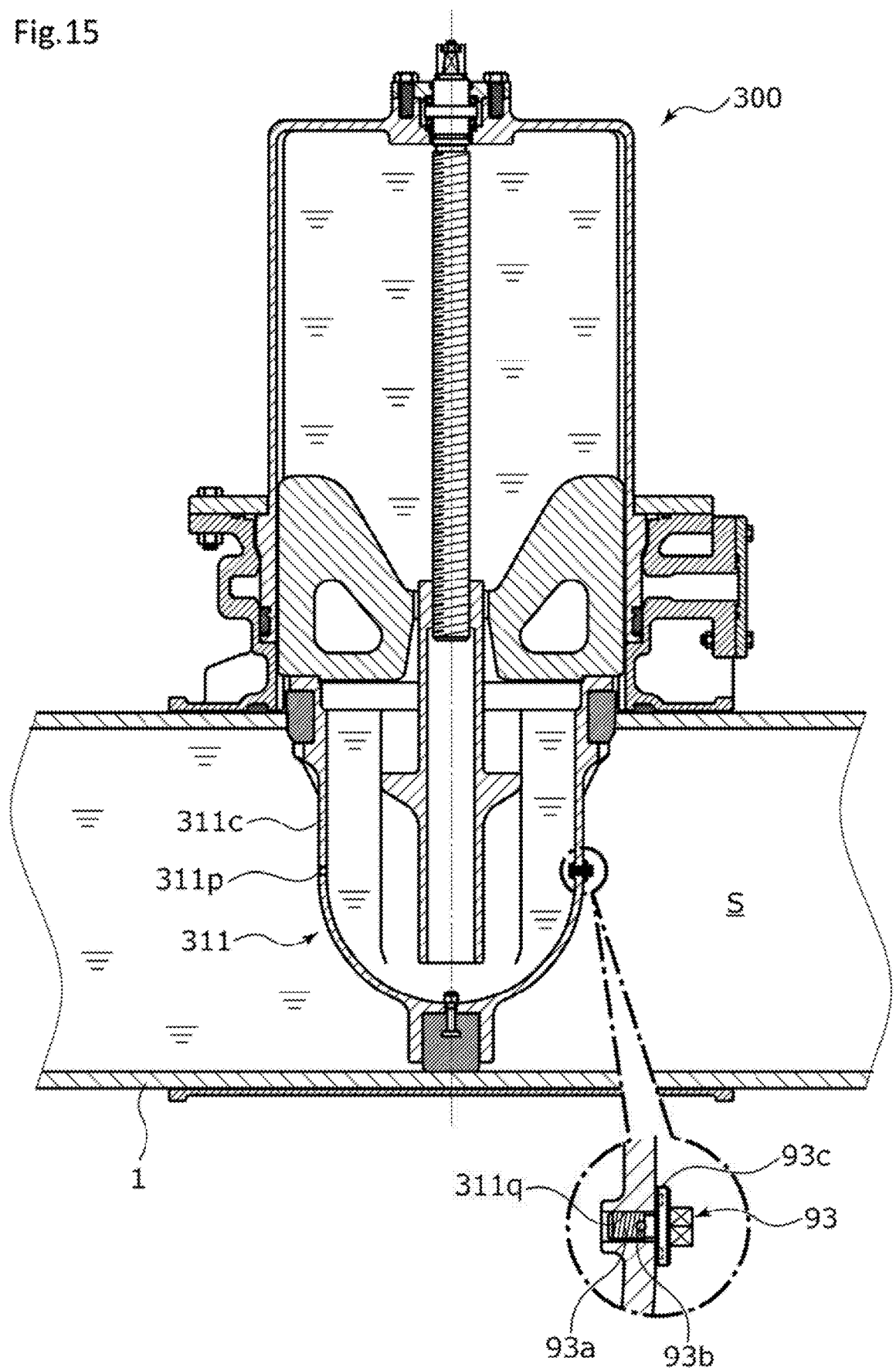
FIG. 15 is a front sectional view showing a third modified example of the first embodiment.

Next, a fluid control valve in a third modified example will be described based on FIG. 15. As shown in FIG. 15, a valve body 311 of the fluid control valve 300 of the third modified example is configured such that a first communication hole 311p and a second communication hole 311q are formed at a side portion of a valve body portion 311c.

A water stop plug 93 as a plug portion is screwed into the second communication hole 311q. A shaft portion 93a of the water stop plug 93 is in a cylindrical shape, and an opening 93b is formed in communication with the substantially center and sides of the shaft portion 93a in an axial direction thereof. A lid portion 93c projecting in the outer diameter direction is formed at an end portion of the shaft portion 93a on the predetermined section S side, and contacts an outer portion of the valve body portion 311c to hermetically close the second communication hole 311q.

Before cutting or disassembly of the predetermined section S side with respect to the valve body 311 in the fluid pipe 1, the second communication hole 311q is closed by the water stop plug 93. Thus, fluid on the upstream side with respect to the valve body 311 in the fluid pipe 1 flows into an inner space of the valve body portion 311c through the first communication hole 311p, but the flow of fluid into the predetermined section S side with respect to the valve body 311 in the fluid pipe 1 through the second communication hole 311q is prevented.

After cutting or disassembly of the predetermined section S side with respect to the valve body 311 in the fluid pipe 1 (see FIG. 1B), the water stop plug 93 is loosened before connection of the new fluid pipe 1A to the cut portion of the predetermined section S (see FIG. 1C). In this manner, the opening 93b of the water stop plug 93 is opened to the predetermined section S side in the fluid pipe 1, and fluid on the upstream side with respect to the valve body 311 in the fluid pipe 1 flows into the predetermined section S. Thereafter, the new fluid pipe 1A is connected to the cut portion of the predetermined section S, and the predetermined section S including the fluid pipe 1A is filled with fluid. Thus, both sides of the valve body 311 in the pipe axis direction in the fluid pipe 1 can be pressure-adjusted or be under the same pressure.

Note that in the third modified example, the form in which the water stop plug 93 is screwed into the second communication hole 311$q$ has been described as an example, but the water stop plug 93 may be screwed into the first communication hole 311$p$. In this case, an opening may be formed on the upstream side with respect to the valve body 311 in the fluid pipe 1, and the water stop plug 93 may be loosened using a predetermined tool through the opening. Alternatively, the second communication hole 311$q$ may be formed larger, and the water stop plug 93 may be loosened using a predetermined tool. The plug portion is not limited to the water stop plug 93 as long as the plug portion can open/close the first communication hole 311$p$ or the second communication hole 311$q$, and may be freely changed.

Figure 16:
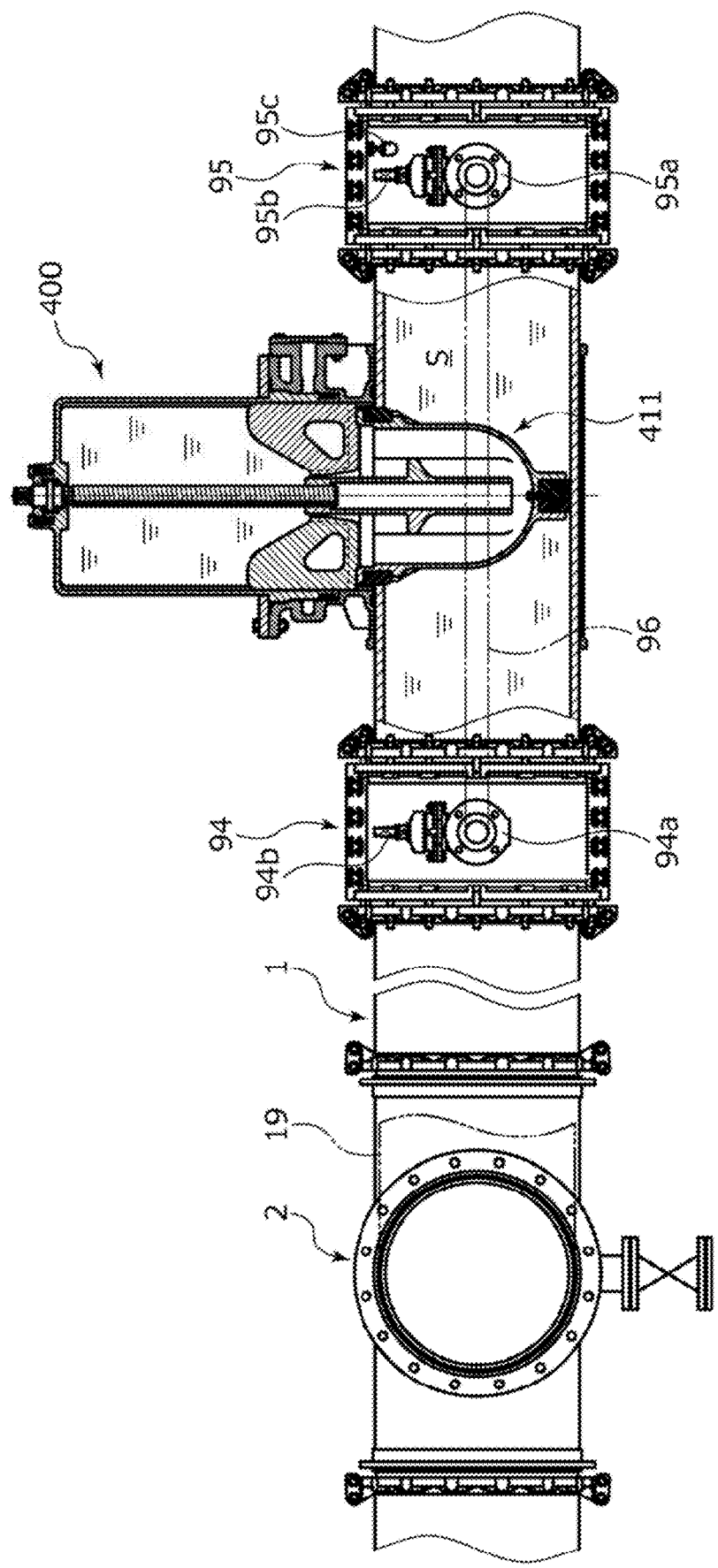
FIG. 16 is a partial sectional front view showing a fourth modified example of the first embodiment.

Next, a pressure adjustment step for a fluid control valve in a fourth modified example will be described based on FIG. 16. As shown in FIG. 16, a valve body 411 of the fluid control valve 400 of the fourth modified example has the same configuration as that of the fluid control valve 10 of the first embodiment, except that the first plug portion 11$g$, the second plug portion 11$h$, the first communication hole 11$p$, and the second communication hole 11$q$ are not provided.

At the pressure adjustment step for the fluid control valve 400, a branching housing 94 is hermetically fitted and placed on the fluid pipe 1 between the fluid control valve 400 and the branching housing 2 on the upstream side, and a branching housing 95 is hermetically fitted and placed on the fluid pipe 1 between the fluid control valve 400 and the cut portion on the predetermined section S side. Moreover, in these branching housings 94, 95, not-shown opening portions are formed at the fluid pipe 1.

A branch portion 94$a$ of the branching housing 94 and a branch portion 95$a$ of the branching housing 95 communicate with each other through a bypass pipe 96 different from the above-described bypass pipe 19. On-off valves 94$b$, 95$b$ are each provided at the branch portions 94$a$, 95$a$, and can switch a communication state among the branching housings 94, 95 and the bypass pipe 96.

Before cutting or disassembly of the predetermined section S side with respect to the valve body 411 in the fluid pipe 1, the on-off valves 94$b$, 95$b$ are closed. After cutting or disassembly of the predetermined section S side with respect to the valve body 411 in the fluid pipe 1 (see FIG. 1B), the new fluid pipe 1A (see FIG. 1C) is connected to the cut portion of the predetermined section S, and the on-off valves 94$b$, 95$b$ are opened such that fluid on the upstream side with respect to the valve body 411 in the fluid pipe 1 flows into the predetermined section S. At this point, air in the predetermined section S is discharged to the outside through an air ventilation port 95$c$ of the branching housing 95.

In this manner, the inside of the predetermined section S is filled with pipe fluid, and both sides of the valve body 411 in the fluid pipe 1 can be pressure-adjusted or be under the same pressure. Thus, valve opening operation for the valve body 411 can be easily performed.

Figure 17:
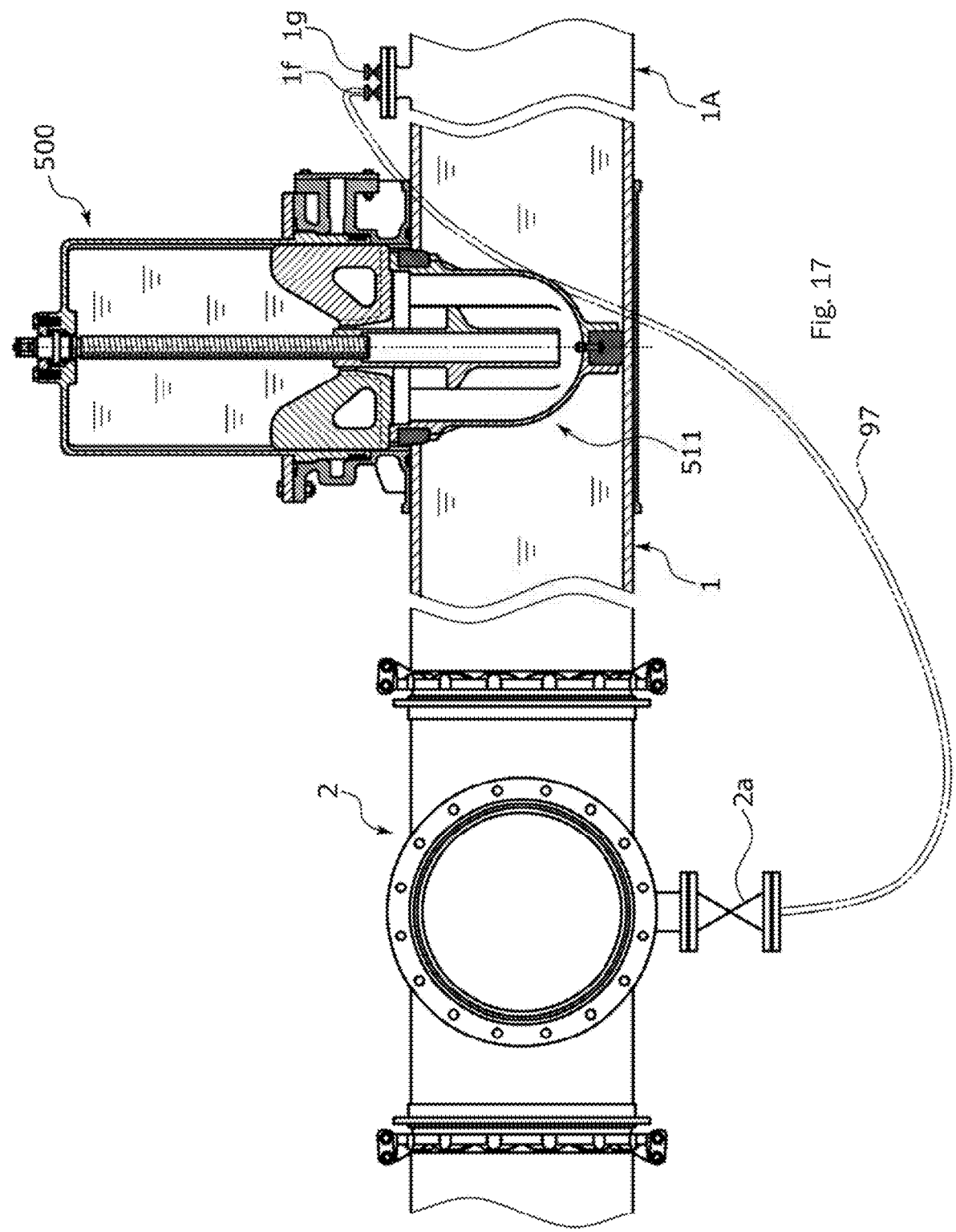
FIG. 17 is a partial sectional front view showing a fifth modified example of the first embodiment.

Next, a pressure adjustment step for a fluid control valve in a fifth modified example will be described based on FIG. 17. As shown in FIG. 17, a valve body 511 of the fluid control valve 500 of the fifth modified example has the same configuration as that of the fluid control valve 10 of the first embodiment, except that the first plug portion 11$g$, the second plug portion 11$h$, the first communication hole 11$p$, and the second communication hole 11$q$ are not provided.

At the pressure adjustment step for the fluid control valve 500, after cutting or disassembly of the predetermined section S side with respect to the valve body 511 in the fluid pipe 1, the new fluid pipe 1A is connected to the cut or disassembled portion. Thereafter, a cylinder 97 connected to a branch portion of the branching housing 2 through an on-off valve 2$a$ is connected to a fluid injection port 1$f$ of the fluid pipe 1A. At this point, the on-off valve 2$a$ is in a close state.

Thereafter, the on-off valve 2$a$ is opened while air in the predetermined section S is being vented through an air ventilation port 1$g$ of the fluid pipe 1A, and fluid on the upstream side with respect to the valve body 511 in the fluid pipe 1 is injected into the predetermined section S through the branching housing 2, the cylinder 97, and the fluid injection port 1$f$. In this manner, the inside of the predetermined section S is filled with pipe fluid. Thus, both sides of the valve body 511 in the fluid pipe 1 can be pressure-adjusted or be under the same pressure, and therefore, valve opening operation for the valve body 511 can be easily performed.

Second Embodiment

Next, a fluid control valve opening method and a fluid control valve used therefor according to a second embodiment of the present invention will be described with reference to FIGS. 18 to 23. Note that description of the same overlapping configurations as those of the first embodiment will be omitted.

Figure 18:
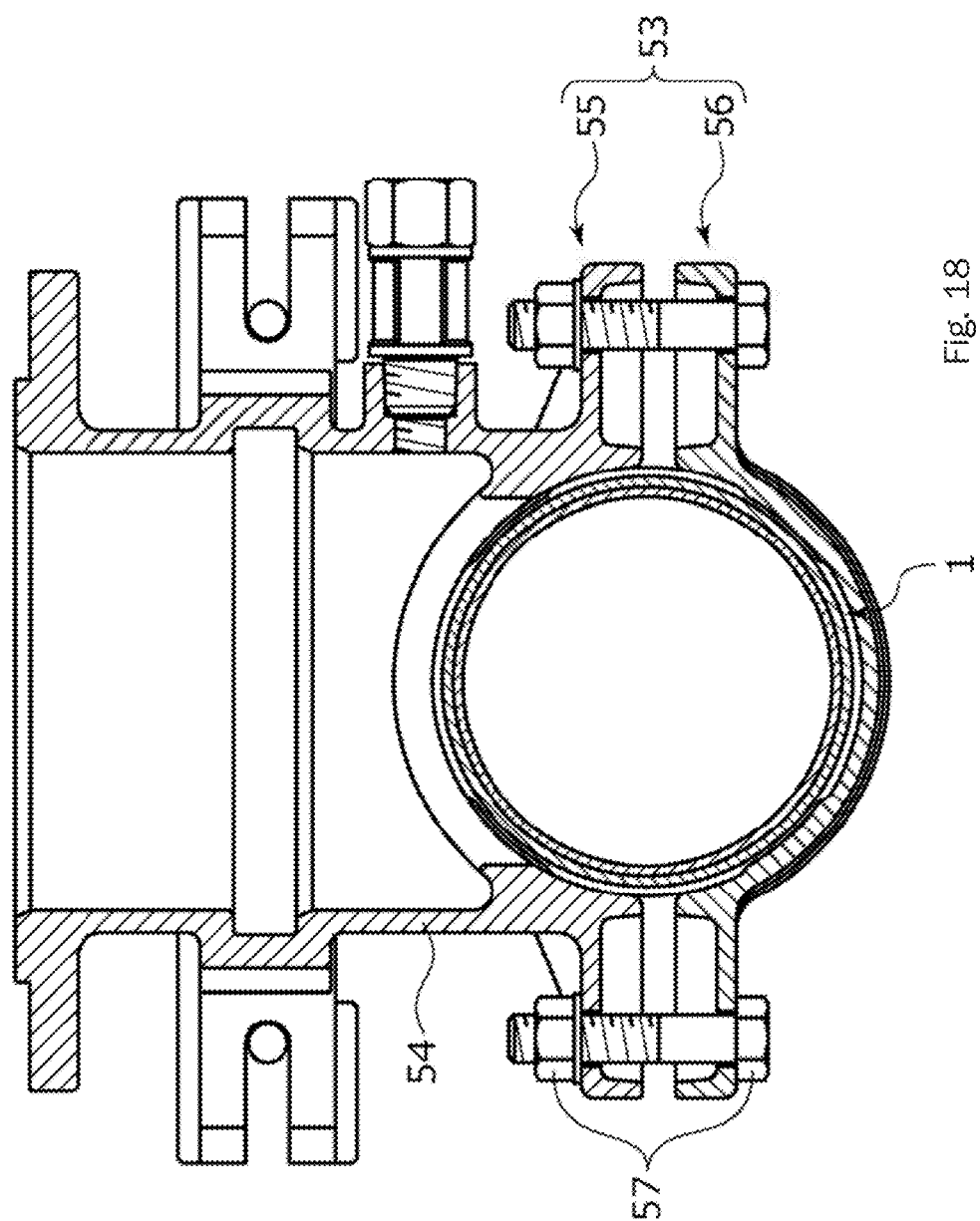
FIG. 18 is a side sectional view showing a housing fitted onto a fluid pipe in a second embodiment of the present invention.

First, as shown in FIG. 18, a housing 53 is hermetically fitted onto an outer peripheral surface of a fluid pipe 1 as an attachment portion of a fluid control valve 600 according to the present invention. The housing 53 mainly includes a first divided body 55 forming an upper side and a second divided body 56 forming a lower side, and a neck portion 54 extending upwardly is formed at the first divided body 55. In the state of FIG. 18, i.e., a state before drilling of the fluid pipe 1, fastening members 57 including bolts/nuts for coupling the first divided body 55 and the second divided body 56 are loosened, and therefore, the housing 53 is turnable in a circumferential direction relative to the fluid pipe 1.

Figure 19:
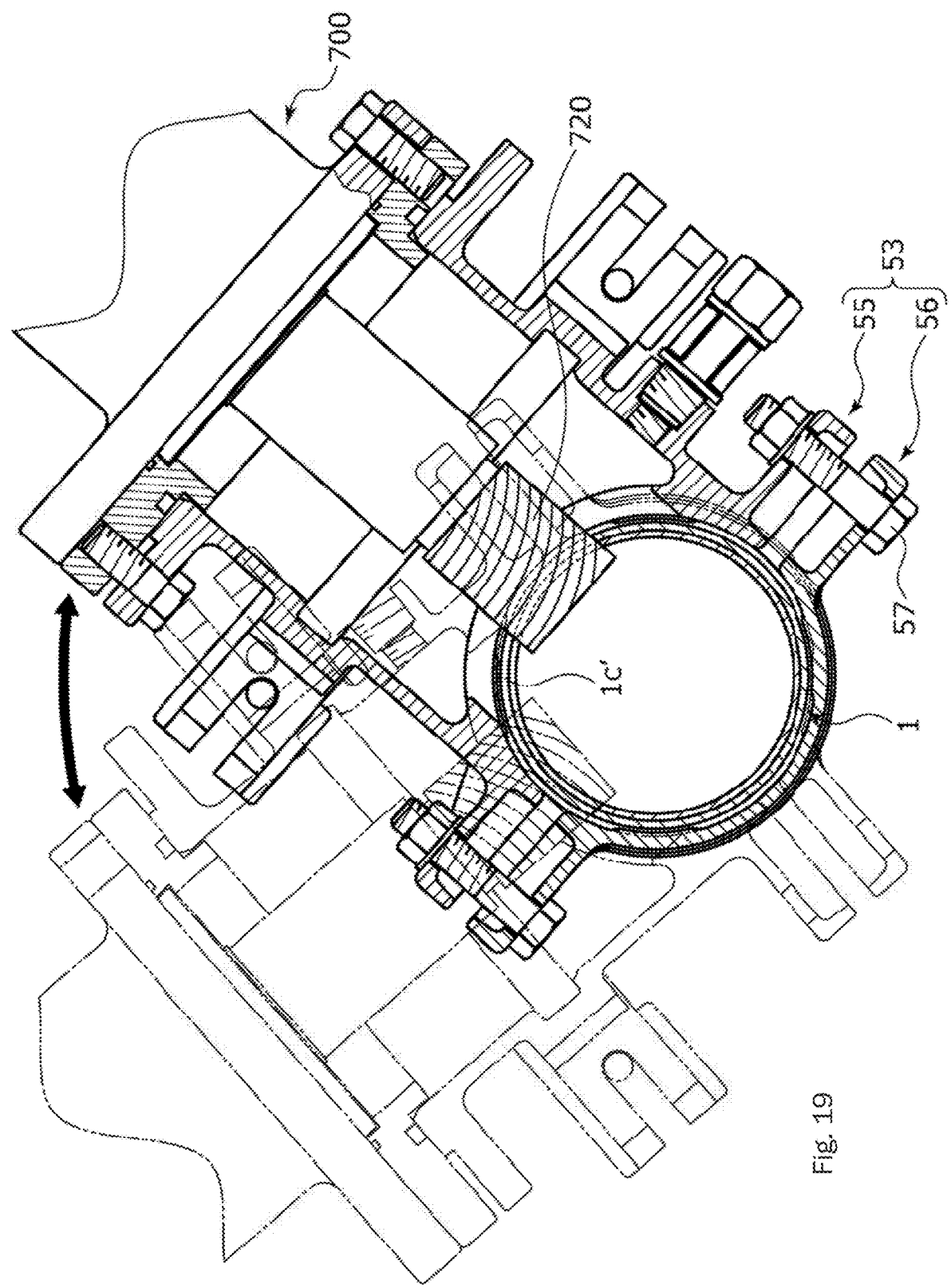
FIG. 19 is a side sectional view showing a situation where the fluid pipe is drilled by a boring machine in the second embodiment.

As shown in FIG. 19, after the housing 53 is fitted onto the fluid pipe 1, a boring machine 700 is hermetically connected to the neck portion 54 of the housing 53. A cutter 720 of the boring machine 700 applied to the present embodiment is an endmill including a drilling blade at an outer peripheral surface of a shaft body. After the cutter 720 has been moved in an axial direction to a position at which part of the cutter 720 penetrates a pipe wall of a pipe top portion of the fluid pipe 1 while rotating about an axis, the cutter 720 and the housing 53 are together turned in the circumferential direction of the fluid pipe 1 while the cutter 720 keeps rotating, and in this manner, a hole 1$c'$ is formed. Thus, the hole 1$c'$ is a long hole elongated in the circumferential direction.

Figure 20:
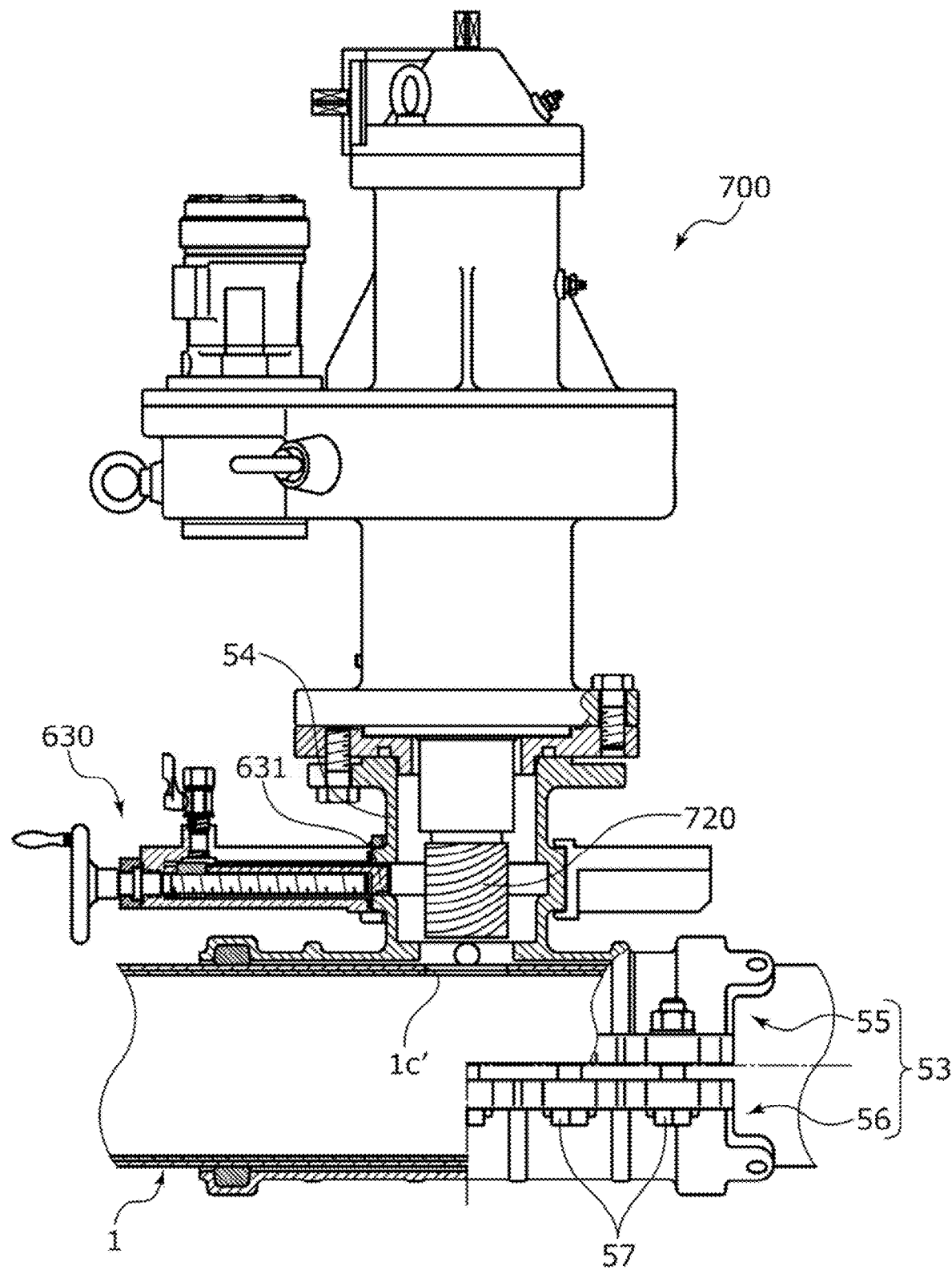
FIG. 20 is a partial sectional front view showing a situation where drilling of the fluid pipe has been completed by the boring machine.

Subsequently, as shown in FIG. 20, after the position of the housing 53 in the circumferential direction has been adjusted such that the cutter 720 is positioned above the pipe top portion of the fluid pipe 1, the fastening members 57 are fastened to immovably fix the housing 53 to the fluid pipe 1. Thereafter, the cutter 720 is pulled up. Although not shown in the figure, when the cutter 720 is arranged above a process valve body 631 of a process valve device 630, the process valve body 631 is closed, and the boring machine 700 is detached from the neck portion 54 of the housing 53.

Figure 21:
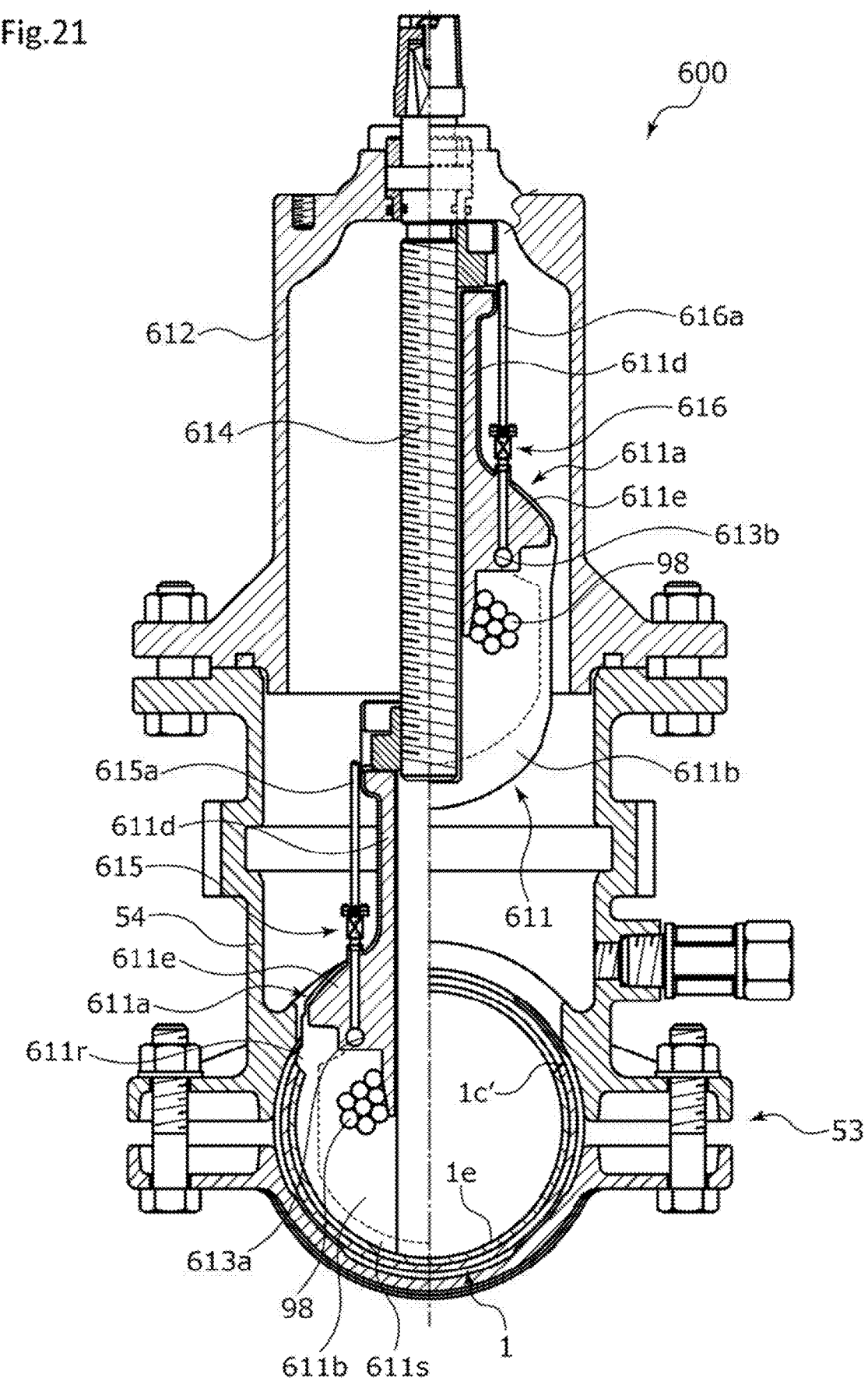
FIG. 21 is a schematic side sectional view showing a valve open state and a valve close state of a fluid control valve in the second embodiment.
Figure 22:
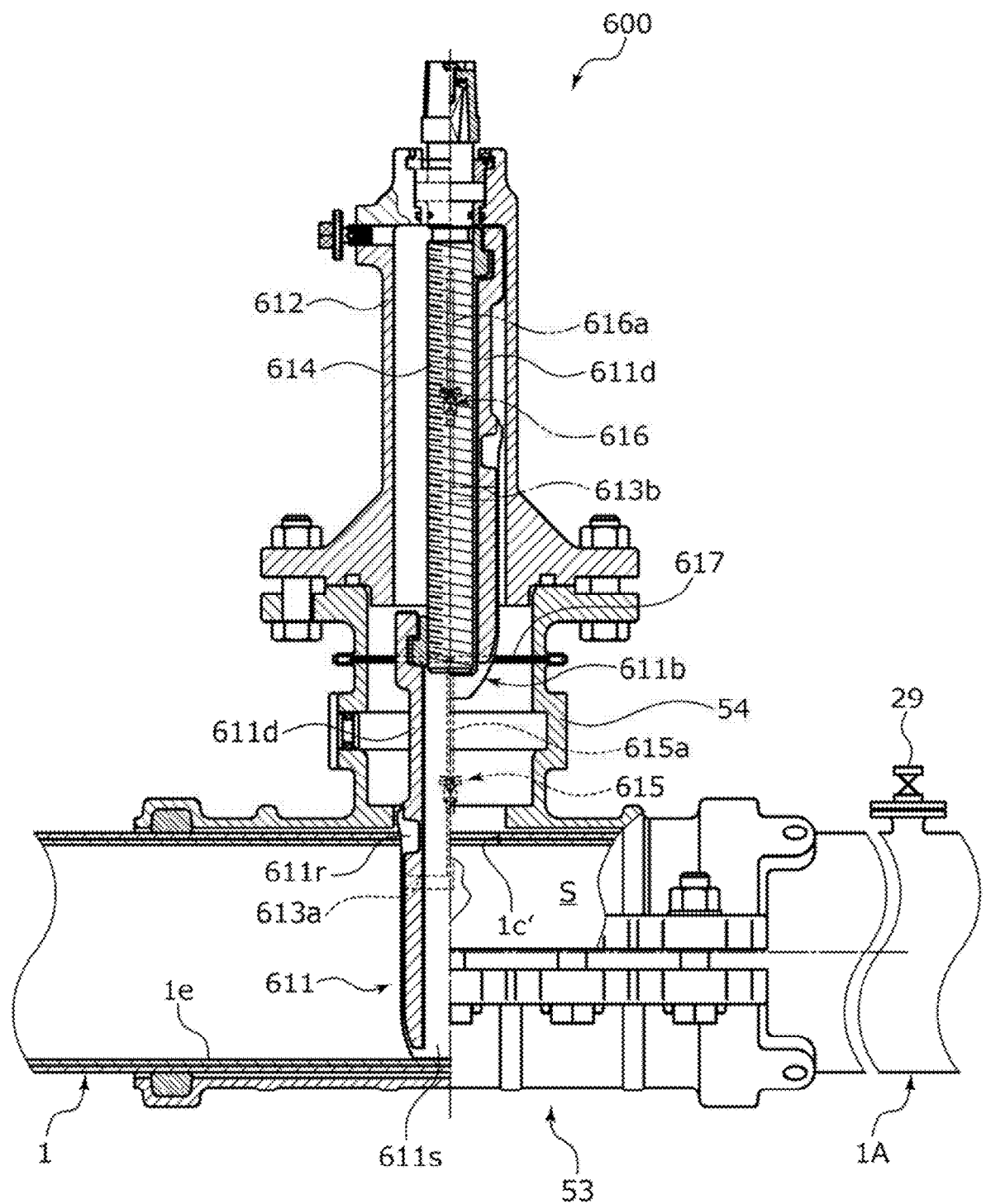
FIG. 22 is a schematic front sectional view as in FIG. 21.

Subsequently, as shown in FIGS. 21 and 22, a valve body 611 and a valve housing 612 are connected to the neck portion 54 of the housing 53 to form the fluid control valve 600.

The valve body 611 mainly includes an internal thread piece 611a as a movement portion screwed onto a shaft member 614 of the valve housing 612, a seal portion 611b provided at a valve body portion of the internal thread piece 611a by vulcanization, and many small-diameter spherical bodies 98 accommodated in a space sandwiched by the valve body portion and the seal portion 611b. Note that in FIG. 21, only some of the many spherical bodies 98 are shown. Note that the present invention is not limited to the spherical body 98, and a circular rod or a cylinder may be employed, for example.

The internal thread piece 611a includes a cylindrical shaft portion 611d screwed onto the shaft member 614 and projecting portions 611e projecting in a direction perpendicular to a pipe axis direction of the fluid pipe 1 from both sides of a lower end portion of the shaft portion 611d. At one projecting portion 611e, a communication passage 613a (equivalent to a first communication passage) communicating with an upstream side with respect to the valve body 611 in the fluid pipe 1 and a space in the valve housing 612 is formed. At the other projecting portion 611e, a communication passage 613b (equivalent to a second communication passage) communicating with a downstream side (a predetermined section S side) with respect to the valve body 611 in the fluid pipe 1 and the space in the valve housing 612 is formed.

A first on-off valve 615 is connected to an end portion of the communication passage 613a on a valve housing 612 side. A valve body of the first on-off valve 615 has, in a normal state, a check valve structure allowing the flow of fluid from the upstream side in the fluid pipe 1 to the valve housing 612 side and blocking fluid communication from the valve housing 612 side to the upstream side in the fluid pipe 1. Moreover, the first on-off valve 615 has an operation lever 615a extending upwardly, and the operation lever 615a can be operated in such a manner that an upstream-side operation screw 617 provided at the neck portion 54 of the housing 53 is operated from the outside. By operation of the operation lever 615a, the valve body of the first on-off valve 615 allows fluid communication from the valve housing 612 side to the upstream side in the fluid pipe 1. Note that the first on-off valve 615 may have such a structure that the flow of fluid in any direction is blocked in the normal state without the above-described check valve structure.

A second on-off valve 616 is connected to an end portion of the communication passage 613b on the valve housing 612 side. A valve body of the second on-off valve 616 allows, in a normal state, the flow of fluid from the predetermined section S side to the valve housing 612 side, and blocks fluid communication from the valve housing 612 side to the predetermined section S side. Moreover, the second on-off valve 616 has an operation lever 616a extending upwardly, and the operation lever 616a can be operated in such a manner that the downstream-side operation screw 617 provided at the neck portion 54 of the housing 53 is operated from the outside. By operation of the operation lever 616a, the valve body of the second on-off valve 616 allows fluid communication from the valve housing 612 side to the predetermined section S side. Note that the second on-off valve 616 may have such a structure that the flow of fluid in any direction is blocked in the normal state.

The seal portion 611b includes a first seal portion 611r contactable along an inner peripheral surface of a hole 1c and a second seal portion 611s contactable along an inner peripheral surface 1e of the fluid pipe 1.

The spherical body 98 is formed of a member with different mechanical properties from those of the seal portion 611b, and many spherical bodies 98 are accommodated in the space sandwiched by the internal thread piece 611a and the seal portion 611b. Each spherical body 98 is slightly movable in the space sandwiched by the internal thread piece 611a and the seal portion 611b.

In a valve open state of the valve body 611, the valve body 611 is accommodated in the valve housing 612. At this point, the horizontal width of a portion of the valve body 611 other than the first seal portion 611r is smaller than the horizontal width of the hole 1c' of the fluid pipe 1. Thus, the valve body 611 can be easily inserted into the fluid pipe 1 through the hole 1c' of the fluid pipe 1.

In a valve close state of the valve body 611, after the internal thread piece 611a and the seal portion 611b have moved down to contact a bottom portion of the inner peripheral surface 1e of the fluid pipe 1, the internal thread piece 611a further moves down relative to the seal portion 611b to compress and expand the seal portion 611b and downwardly and laterally press each spherical body 98 by the internal thread piece 611a. At this point, the first seal portion 611r also pressure-contacts an inner peripheral surface of the hole 1c' of the fluid pipe 1. Each spherical body 98 is vertically sandwiched by the internal thread piece 611a and the bottom portion of the inner peripheral surface 1e of the fluid pipe 1, and accordingly, moves laterally. The seal portion 611b is expanded in a width direction, and accordingly, the second seal portion 611s pressure-contacts the inner peripheral surface 1e of the fluid pipe 1 and the flow of fluid in the fluid pipe 1 is reliably blocked. That is, the internal thread piece 611a and the spherical bodies 98 form an expansion unit configured to expand the seal portion 611b in the width direction.

In the valve close state of the valve body 611, the upstream-side operation screw 617 can be operated such that fluid flowing on the upstream side with respect to the valve body 611 in the fluid pipe 1 flows into the valve housing 612 side through the communication passage 613a and the first on-off valve 615 and fluid having flowed into the valve housing 612 is, on the other hand, blocked by the second on-off valve 616 and does not flow into the predetermined section S side.

As shown in FIG. 22, after the predetermined section S side in the fluid pipe 1 has been cut or disassembled in the valve close state of the valve body 611, a new fluid pipe 1A is connected to such a cut portion. At this point, atmospheric air is present on the predetermined section S side.

After the new fluid pipe 1A has been connected to the cut portion of the predetermined section S, the valve opening step of opening the valve body 611 in the valve close state is performed. When the valve opening step is performed for the valve body 611, the upstream-side and downstream-side operation screws 617 provided at the neck portion 54 of the housing 53 are first operated from the outside to operate the operation lever 615a and the operation lever 616a of the first on-off valve 615 and the second on-off valve 616, thereby opening the valve bodies of the first on-off valve 615 and the second on-off valve 616. Accordingly, fluid flows into the predetermined section S side through the valve housing 612. Note that at this point, the air ventilation hole 29 of the new fluid pipe 1A is opened to release air in the predetermined section S to the outside. With this configuration, the inside of the predetermined section S can be filled with pipe fluid, and both sides of the valve body 611 in the pipe axis direction in the fluid pipe 1 can be pressure-adjusted or be under the same pressure.

Figure 23:
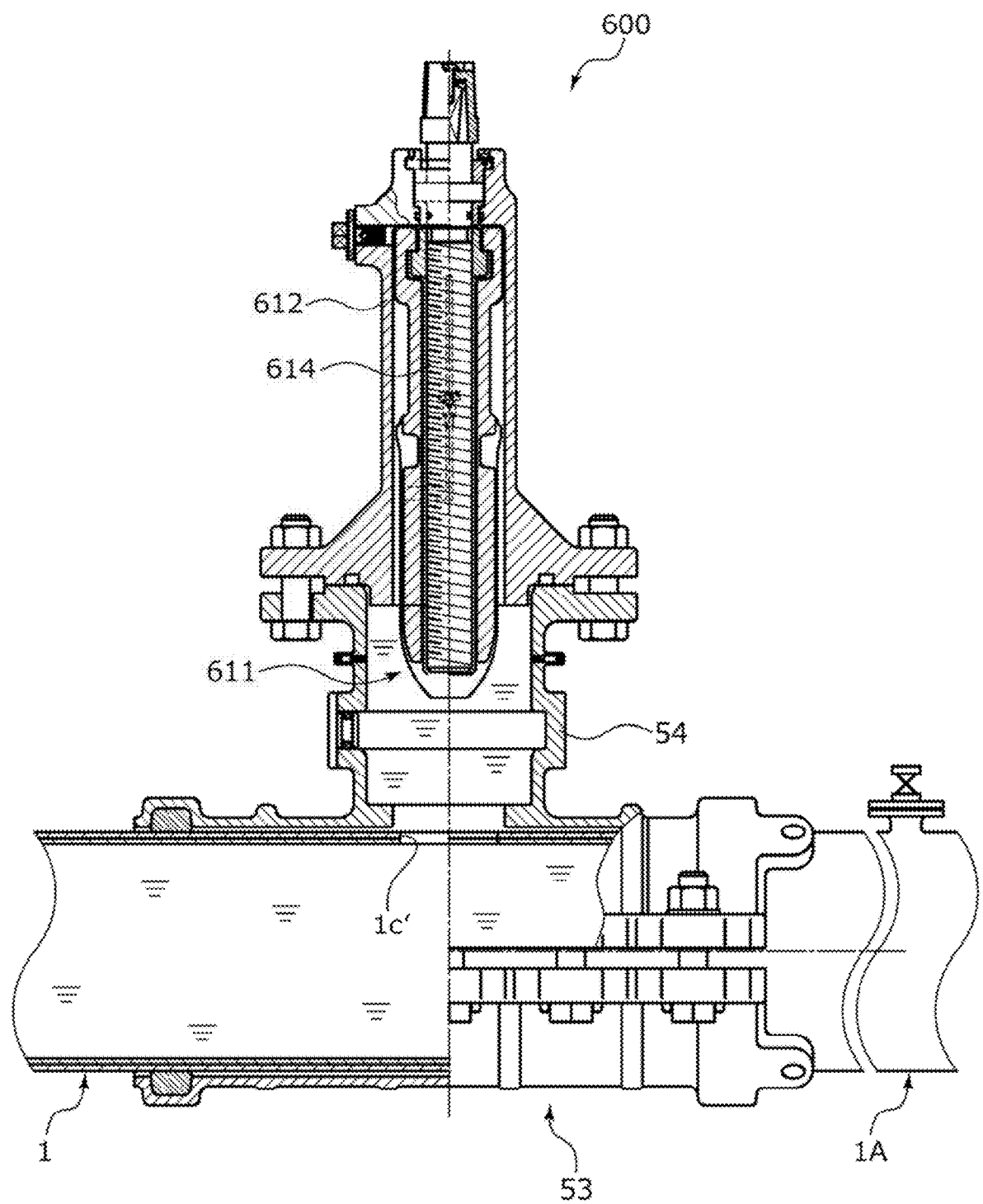
FIG. 23 is a front sectional view showing the valve open state of the fluid control valve in the second embodiment.

Thereafter, as shown in FIG. 23, the valve body 611 is moved up until the valve body 611 is accommodated in the valve housing 612, and in this manner, the valve body 611 is brought into the valve open state and the fluid pipe 1 and the new fluid pipe 1A communicate with each other. As described above, the valve open operation can be easily performed for the valve body 611 in a state in which both sides of the valve body 611 in the pipe axis direction in the fluid pipe 1 are pressure-adjusted or are under the same pressure.

The embodiments of the present invention have been described above with reference to the drawings, but the specific configurations are not limited to these embodiments. Even changes and additions made without departing from the gist of the present invention are included in the present invention. Of each embodiment and each modified example, utilizable configurations may be used in combination, or may be applied to each other. For example, the following applications are available: a configuration such as the second to fifth modified examples may be used without the communication passage 613a, the first on-off valve 615, the operation lever 615a, the operation screw 617, the communication passage 613b, the second on-off valve 616, the operation lever 616a, and the operation screw 617 of the second embodiment or these configurations may remain and be used in combination of the second to fifth modified examples.

For example, in the first and second embodiments and the first to fifth modified examples, it is configured such that the hole is drilled at the fluid pipe in the housing by the drilling unit and the valve body is inserted into the hole. However, the hole of the present invention is not limited to such a configuration. For example, a hole such as a branching hole formed in advance at a T-shaped pipe as a fluid pipe or a sluice valve joined to a fluid pipe by a flange or an insertion acceptance form may be employed.

For example, in the first embodiment, the form in which drilling is performed by the hole saw has been described as an example. In the second embodiment, the form in which drilling is performed by the endmill has been described as an example. However, the present invention is not limited to these forms, and drilling may be performed by a boring machine such as a cutting device or a wire saw device.

In the first and second embodiments and the first to fifth modified examples, the form in which both sides of the valve body in the pipe axis direction in the fluid pipe are brought under the same pressure at the pressure adjustment step has been described as an example, but the present invention is not limited to such a form. Both sides of the valve body in the pipe axis direction in the fluid pipe is not necessarily under the same pressure as long as the pressure difference therebetween is decreased, and may be under the substantially same pressure. Note that the pressure difference is preferably equal to or lower than 1.5 MPa, but the present invention is not limited to such a pressure difference. The peripheral portion 11r of the seal portion 11b is not necessarily formed across the entire circumference of the hole 1c, and may be a well-known structure in which the peripheral portion 11r opens to the upstream-side hole. In this case and the cases of the first embodiment and the third modified example, both sides may be pressure-adjusted or be under the same pressure by coupling between a downstream fluid injection port and, e.g., a cylinder by means of the communication opening portion 17, or a mechanism using the communication opening portion 17 for the valve housing 12 may be provided and both sides may be pressure-adjusted or be under the same pressure by coupling between a downstream fluid injection port and, e.g., a cylinder.

REFERENCE SIGNS LIST

1, 1A Fluid pipe
1c, 1c' Hole
5 Housing
5a Pipe line housing portion
5b Opening portion
5c Open end portion
5d Neck portion
5e Flange portion
5f Pressing bolt
10, 10' Fluid control valve
11, 11' Valve body
11a Internal thread piece (movement portion)
11b Seal portion
11c Valve body portion
11g First plug portion (switching unit, plug portion)
11h Second plug portion (switching unit, plug portion)
11p First communication hole
11q Second communication hole
12 Valve housing
14 Shaft member
53 Housing
93 Water stop plug (switching unit, plug portion)
100 Fluid control valve
111 Valve body
111a Internal thread piece (movement portion)
111b Seal portion
111c Valve body portion
200 Fluid control valve
211 Valve body
300 Fluid control valve
311 Valve body
311c Valve body portion
311p First communication hole
311q Second communication hole
400 Fluid control valve
411 Valve body
500 Fluid control valve
511 Valve body
600 Fluid control valve
611 Valve body
611a Internal thread piece (movement portion)
611b Seal portion
612 Valve housing
613a Communication passage
613b Communication passage
614 Shaft member
615 First on-off valve
616 Second on-off valve (switching unit, plug portion)
S Predetermined section
S1 Inner space

The invention claimed is:

1. A method of opening a fluid control valve for controlling fluid, the fluid control valve including a housing externally fitted onto a fluid pipe in a hermetic state and a valve body configured to hermetically block or open a flow of fluid in the fluid pipe, said method comprising:
a pressure adjustment step of decreasing a pressure difference between the fluid in the fluid pipe on a first side of the valve body and the fluid in the fluid pipe on a second side of the valve body in a blocking state of the valve body, the first side and the second side of the valve body being arranged so as to sandwich the valve body in an axial direction of the fluid pipe; and a valve opening step of opening the valve body.

2. The method of opening the fluid control valve according to claim 1, wherein in the pressure adjustment step, a fluid is charged through an injection port communicating with in the fluid pipe on the first side of the valve body or the second side of the valve body.

3. The method of opening the fluid control valve according to claim 2, wherein in the pressure adjustment step, the fluid is charged through the injection port, while air is vented through an air ventilation port communicating with in the fluid pipe on the first side of the valve body or the second side of the valve body.

4. The method of opening the fluid control valve according to claim 1, wherein in the pressure adjustment step, the fluid in the fluid pipe on the first side of the valve body is charged to the fluid pipe on the second side of the valve body.

5. The method of opening the fluid control valve according to claim 4, wherein in the pressure adjustment step, the fluid is charged through a bypass passage communicating with in the fluid pipe on the first side of the valve body and the second side of the valve body.

* * * * *